(12) United States Patent
Tominaga et al.

(10) Patent No.: US 11,865,750 B2
(45) Date of Patent: Jan. 9, 2024

(54) COMPOSITE STRUCTURE AND HOUSING FOR ELECTRONIC DEVICE

(71) Applicant: MITSUI CHEMICALS, INC., Tokyo (JP)

(72) Inventors: Takahiro Tominaga, Ichihara (JP); Kazuki Kimura, Sodegaura (JP)

(73) Assignee: MITSUI CHEMICALS, INC., Tokyo (JP)

( * ) Notice: Subject to any disclaimer, the term of this patent is extended or adjusted under 35 U.S.C. 154(b) by 61 days.

(21) Appl. No.: 17/267,342

(22) PCT Filed: Aug. 7, 2019

(86) PCT No.: PCT/JP2019/031237
§ 371 (c)(1),
(2) Date: Feb. 9, 2021

(87) PCT Pub. No.: WO2020/032138
PCT Pub. Date: Feb. 13, 2020

(65) Prior Publication Data
US 2021/0237322 A1    Aug. 5, 2021

(30) Foreign Application Priority Data

Aug. 10, 2018  (JP) .................................. 2018-151598
Nov. 16, 2018  (JP) .................................. 2018-215777

(51) Int. Cl.
*B29C 45/14*     (2006.01)
*B29C 45/27*     (2006.01)
(Continued)

(52) U.S. Cl.
CPC .... *B29C 45/14467* (2013.01); *B29C 45/2708* (2013.01); *B29C 65/56* (2013.01);
(Continued)

(58) Field of Classification Search
CPC .......... B29C 45/14467; B29C 45/2708; B29C 65/56; B29C 66/7422; B29C 45/14311;
(Continued)

(56) References Cited

U.S. PATENT DOCUMENTS 4,957,968 A    9/1990  Adur et al.
5,564,714 A    10/1996 Katsuno et al.
(Continued)

FOREIGN PATENT DOCUMENTS

EP    3 476 563 A1    5/2019
JP    H06-246848 A    9/1994
(Continued)

OTHER PUBLICATIONS

International Searching Authority, "International Search Report," issued in connection with International Patent Application No. PCT/JP2019/031237, dated Aug. 17, 2019.
(Continued)

*Primary Examiner* — Christopher W Raimund
(74) *Attorney, Agent, or Firm* — Foley & Lardner LLP

(57) ABSTRACT

A composite structure includes: a metal member; and a thermoplastic resin member bonded to the metal member, in which the metal member has a fine uneven structure at least on a metal surface to which the thermoplastic resin member is bonded, a hardness of the thermoplastic resin member measured by a type A durometer in accordance with JIS K6253 is in a range of equal to or more than A60 and equal to or less than A95, and an acid value of the thermoplastic resin member is equal to or more than 1 mgKOH/g and equal to or less than 100 mgKOH/g. The thermoplastic resin member preferably contains a urethane-based thermoplastic elastomer, an amide-based thermoplastic elastomer, and an acid-modified polyolefin.

8 Claims, 13 Drawing Sheets

(51) Int. Cl.
*B29C 65/56* (2006.01)
*B29C 65/00* (2006.01)
*B29K 75/00* (2006.01)
*B29K 705/02* (2006.01)
*B29L 31/34* (2006.01)

(52) U.S. Cl.
CPC ...... *B29C 66/7422* (2013.01); *B29K 2075/00* (2013.01); *B29K 2705/02* (2013.01); *B29K 2715/00* (2013.01); *B29L 2031/3481* (2013.01)

(58) Field of Classification Search
CPC ........... B29C 2045/14459; B29C 2045/14868; B29C 45/14336; B29K 2075/00; B29K 2705/02; B29K 2715/00; B29K 2021/003; B29L 2031/3481; B32B 15/08; B32B 15/095; H05K 5/00
See application file for complete search history.

(56) References Cited

U.S. PATENT DOCUMENTS

| | | | |
|---|---|---|---|
| 5,577,314 A | 11/1996 | Katsuno et al. | |
| 5,624,999 A | 4/1997 | Lombardi et al. | |
| 5,733,493 A | 3/1998 | Katsuno et al. | |
| 6,064,002 A * | 5/2000 | Hayami | G01P 1/026 174/61 |
| 6,503,984 B2 | 1/2003 | Johnson et al. | |
| 7,790,094 B2 | 9/2010 | Lim et al. | |
| 8,066,288 B2 | 11/2011 | Burdzy et al. | |
| 8,168,718 B2 | 5/2012 | Crafton et al. | |
| 8,197,989 B2 | 6/2012 | Jacobine et al. | |
| 8,197,990 B2 | 6/2012 | Burdzy et al. | |
| 9,073,241 B2 | 7/2015 | DeCato et al. | |
| 9,987,824 B2 | 6/2018 | Inoue et al. | |
| 2003/0149155 A1* | 8/2003 | Lin | C08K 3/346 524/445 |
| 2007/0134497 A1 | 6/2007 | Crafton et al. | |
| 2008/0128955 A1 | 6/2008 | Lim et al. | |
| 2008/0289755 A1 | 11/2008 | Burdzy et al. | |
| 2009/0000732 A1 | 1/2009 | Jacobine et al. | |
| 2009/0004541 A1 | 1/2009 | Jacobine et al. | |
| 2009/0004551 A1 | 1/2009 | Burdzy et al. | |
| 2009/0162715 A1 | 6/2009 | Burdzy | |
| 2009/0263669 A1 | 10/2009 | Burdzy et al. | |
| 2011/0068512 A1 | 3/2011 | DeCato et al. | |
| 2011/0089792 A1* | 4/2011 | Casebolt | G06F 1/1616 156/151 |
| 2011/0133366 A1 | 6/2011 | Lim et al. | |
| 2011/0143112 A1* | 6/2011 | Cai | B32B 7/022 525/89 |
| 2013/0062818 A1 | 3/2013 | DeCato et al. | |
| 2015/0224742 A1* | 8/2015 | Inoue | C09D 171/00 428/458 |
| 2015/0367605 A1* | 12/2015 | Morikawa | B32B 15/08 427/388.1 |
| 2019/0299503 A1 | 10/2019 | Kimura et al. | |

FOREIGN PATENT DOCUMENTS

| | | |
|---|---|---|
| JP | 2002-072672 A | 3/2002 |
| JP | 2003-120816 A | 4/2003 |
| JP | 2004-014150 A | 1/2004 |
| JP | 2008-529833 A | 8/2008 |
| JP | 2009-518505 A | 5/2009 |
| JP | 2009-524196 A | 6/2009 |
| JP | 2011-074398 A | 4/2011 |
| WO | WO-2017/209011 A1 | 12/2017 |

OTHER PUBLICATIONS

International Searching Authority, "Written Opinion," issued in connection with International Patent Application No. PCT/JP2019/031237, dated Aug. 17, 2019.

* cited by examiner

COMPOSITE STRUCTURE AND HOUSING FOR ELECTRONIC DEVICE

CROSS-REFERENCE TO RELATED APPLICATIONS

The present application claims priority under 37 U.S.C. § 371 to International Patent Application No. PCT/JP2019/031237, filed Aug. 7, 2019, which claims priority to and the benefit of Japanese Patent Application Nos. 2018-151598, filed on Aug. 10, 2018, and 2018-215777, filed on Nov. 16, 2018. The contents of these applications are hereby incorporated by reference in their entireties.

TECHNICAL FIELD

The present invention relates to a composite structure and a housing for an electronic device.

BACKGROUND ART

Conventionally, rubbers, especially elastomers typified by a silicone rubber, a fluororubber, an acrylic rubber, and the like, have been used in industrial applications such as automobile interior/exterior parts such as an instrument panel, a door panel, and a glass run channel, and grip parts for a gasket, a cap seal, tubes, a muffling gear, and tools.

In using these elastomers for the applications of these industrial products, it was necessary to join a resin member formed of the elastomer and a metal member (Patent Documents 1 to 4).

RELATED DOCUMENT

Patent Document

[Patent Document 1] Japanese Unexamined Patent Publication No. 6-246848
[Patent Document 2] Japanese Unexamined Patent Publication No. 2004-14150
[Patent Document 3] PCT Japanese Translation Patent Publication No. 2008-529833
[Patent Document 4] PCT Japanese Translation Patent Publication No. 2009-524196
[Patent Document 5] Japanese Unexamined Patent Publication No. 2003-120816

SUMMARY OF THE INVENTION

Technical Problem

However, a technique for bonding and integrating the resin member formed of the elastomer and the metal member by an industrially advantageous method and with high adhesion strength has not been put into practical use.

On the other hand, in recent years, portable electronic devices such as a laptop computer, a tablet terminal, a smartphone, a mobile phone, a watch-type terminal, a digital camera, a digital video camera, and a portable music player have become widespread. With the diversification of a usage environment of these portable electronic devices, various performances have been required for the electronic devices. A typical example is a waterproof function. That is, as one of essential performances required for electronic devices, needs for the waterproof function are increasing. There is an increasing demand for a housing for an electronic device, which has an excellent sealing function and reliably exhibits a waterproof function even when using the housing in an environment that is easily exposed to water, such as outdoor environments such as rainfall, the sea, a river, a pool, and a high humidity environment, or indoor environments such as a kitchen, a bathroom, or a state of touching sweat from a human body.

Conventionally, as a method of imparting a waterproof function to a housing for a portable electronic device, for example, in a case of a housing including two pieces, a method in which a packing is disposed in a groove (a housing groove) formed at a peripheral edge part of one piece and the packing is compressed by fitting with the other opposing piece to express a sealing function has been generally used. In addition, as a packing material, an elastomer typified by a silicone rubber, an EPDM rubber, a fluororubber, a chloroprene rubber, an acrylic rubber, or the like was used, and the sealing function was exhibited by repulsive stress.

Recently, from a viewpoint of weight reduction and miniaturization of the portable electronic device itself, there is a remarkable tendency to make a width of a housing groove for disposing the rubber packing as described above narrower and a depth shallower. As a result, a shape having a narrow width and a thin thickness has been desired for a corresponding packing as well.

However, such an ultra-fine packing is prone to a bending deformation or a curl deformation, and is difficult to handle. Therefore, work of mounting on a narrow housing groove has got complicated, and workability at the time of assembling the housing was extremely lowered.

To solve such a problem related to mountability, a technique is proposed in which a thin and soft elastic gasket is temporarily fastened to a support resin film in a peelable state at the time of forming, an overall shape of the elastic gasket is maintained by the support resin film until the elastic gasket is attached to a sealing part, the elastic gasket is attached and fixed to the sealing part while temporarily being fixed to the support resin film, and then, the support resin film is peeled and removed so that an elastic gasket with low rigidity can be easily attached to a sealing portion (Patent Document 5). However, although such a packing temporarily fastened to the support resin film can correspond to a flat-shaped sealing part, it is difficult to correspond to a sealing part having a three-dimensional structure.

From the above, it is required to develop a composite of a thermoplastic resin member formed of an elastomer and a metal member, a composite in which the thermoplastic resin member has a packing function, and a housing, which is for an electronic device and formed of the composite.

The present invention has been made in view of the circumstances, and is to provide a composite structure of a metal member and a thermoplastic resin member, with excellent bonding strength.

Solution to Problem

According to the present invention, a composite structure and a housing for an electronic device shown below are provided.

[1]
A composite structure including:
a metal member; and
a thermoplastic resin member bonded to the metal member,
in which the metal member has a fine uneven structure at least on a metal surface to which the thermoplastic resin member is bonded, a hardness of the thermoplastic resin member measured by a type A durometer in accordance with JIS K6253 is in a range of equal to or more than A60 and equal to or less than A95, and an acid value of the thermoplastic resin member is equal to or more than 1 mgKOH/g and equal to or less than 100 mgKOH/g.

[2]

The composite structure according to [1], in which an average length ($RS_m$) of a roughness curve element of the metal surface on which the fine uneven structure is formed, the average length being measured in accordance with JIS B0601: 2001, is equal to or more than 10 nm and equal to or less than 500 μm.

[3]

The composite structure according to [1] or [2], in which a ten-point average roughness ($R_{zjis}$) of the metal surface on which the fine uneven structure is formed, the ten-point average roughness being measured in accordance with JIS B0601: 2001, is equal to or more than 10 nm and equal to or less than 300 μm.

[4]

The composite structure according to any one of [1] to [3], in which the thermoplastic resin member contains a thermoplastic elastomer.

[5]

The composite structure according to [4], in which a content of the thermoplastic elastomer in the thermoplastic resin member is equal to or more than 50% by mass.

[6]

The composite structure according to [4] or [5], in which the thermoplastic resin member further contains an acid-modified polymer.

[7]

The composite structure according to [6], in which in the thermoplastic resin member, a content of the thermoplastic elastomer is equal to or more than 50% by mass and equal to or less than 99% by mass, and a content of the acid-modified polymer is equal to or more than 1% by mass and equal to or less than 50% by mass.

[8]

The composite structure according to any one of [4] to [7], in which the thermoplastic elastomer contains a urethane-based thermoplastic elastomer.

[9]

The composite structure according to any one of [1] to [8], in which the thermoplastic resin member contains a urethane-based thermoplastic elastomer and an amide-based thermoplastic elastomer.

[10]

The composite structure according to [9], in which a total content of the urethane-based thermoplastic elastomer and the amide-based thermoplastic elastomer in the thermoplastic resin member is equal to or more than 60% by mass and equal to or less than 100% by mass.

[11]

The composite structure according to [9] or [10], in which in the thermoplastic elastomer, a content of the urethane-based thermoplastic elastomer is equal to or more than 70% by mass and less than 100% by mass, and a content of the amide-based thermoplastic elastomer is more than 0% by mass and equal to or less than 30% by mass.

[12]

The composite structure according to any one of [9] to [11], in which the thermoplastic resin member further contains an acid-modified polymer, and a content of the acid-modified polymer in the thermoplastic resin member is equal to or more than 1 part by mass and equal to or less than 35 parts by mass with respect to a total of 100 parts by mass of the urethane-based thermoplastic elastomer and the amide-based thermoplastic elastomer.

[13]

A housing for an electronic device, including the composite structure according to any one of [1] to [12], in which the housing for an electronic device has a first metal member and a second metal member, a packing formed of the thermoplastic resin member is bonded to a peripheral edge part of the first metal member, and an outer shell is formed by integrating the second metal member with the first metal member, with the packing interposed therebetween.

[14]

A housing for an electronic device, including the composite structure according to any one of [1] to [12], in which the housing for an electronic device has a metal member and a plastic member, a packing formed of the thermoplastic resin member is bonded to a peripheral edge part of the metal member, and an outer shell is formed by integrating the metal member with the plastic member, with the packing interposed therebetween.

Advantageous Effects of Invention

According to the present invention, it is possible to provide a composite structure of a metal member and a thermoplastic resin member, with excellent bonding strength.

BRIEF DESCRIPTION OF THE DRAWINGS

FIG. 3(a) shows an I-type pin gate and FIG. 3(b) shows a Z-type pin gate.

DESCRIPTION OF EMBODIMENTS

Figure 1:
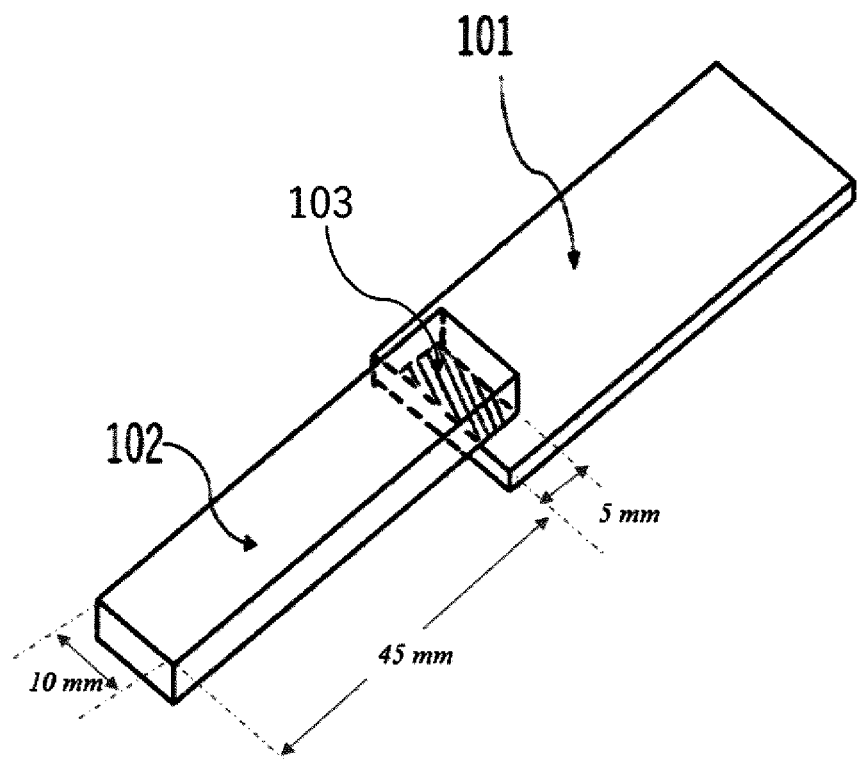
FIG. 1 represents a perspective view schematically showing a structure of a test piece for a tensile shear strength test according to the present embodiment.

Hereinafter, each component configuring a composite structure according to the present invention, a method for preparing the same, and features of the composite structure will be described. Note that, unless otherwise specified, expression "to" between the numbers in the sentence represents equal to or more than the number and equal to or less than the other number.

According to the present embodiment, there is provided a composite structure including: a metal member; and a thermoplastic resin member bonded to the metal member, in which the metal member has a fine uneven structure at least on a metal surface to which the thermoplastic resin member is bonded, a hardness of the thermoplastic resin member measured by a type A durometer in accordance with JIS K6253 is in a range of equal to or more than A60 and equal to or less than A95, and an acid value of the thermoplastic resin member is equal to or more than 1 mgKOH/g and equal to or less than 100 mgKOH/g.

According to the present embodiment, the metal member has the fine uneven structure at least on the metal surface to which the thermoplastic resin member is bonded. Further, the hardness and the acid value of the thermoplastic resin member satisfy the above ranges. Accordingly, it is possible to realize a composite structure having excellent bonding strength between the metal member and the thermoplastic resin member.

In addition, the composite structure according to the present embodiment is excellent in both elasticity and acid resistance commensurate with the bonding strength. Therefore, the composite structure can be suitably used as various packing materials. Further, the composite structure according to the present embodiment may have a feature that collapse of a resin is minimized even when the composite structure is treated with an acidic atmosphere.

The reason for this is not clear, but the following reasons are considered. First, it is considered that the hardness of the thermoplastic resin member becomes appropriate and the thermoplastic resin member easily penetrates into the fine uneven structure formed on a surface of the metal member due to the hardness of the thermoplastic resin member of equal to or less than the above upper limit value and also mechanical strength of the thermoplastic resin member that has penetrated into the fine uneven structure can be improved due to the hardness of the thermoplastic resin member of equal to or more than the above lower limit value. That is, it is considered that a balance between a penetration amount of the thermoplastic resin member into the fine uneven structure and the strength of the thermoplastic resin member becomes appropriate due to the hardness of the thermoplastic resin member within the range, and an anchor effect between the metal member and the thermoplastic resin member is optimized and the bonding strength can be improved.

In addition, it is considered that, due to the acid value of the thermoplastic resin member within the range, an ionic interaction occurs between an acid group contained in the resin member and the metal member, in addition to a physical bonding force due to the anchor effect, and as a result, the bonding strength between the metal member and the thermoplastic resin member can be improved.

It is considered that a composite structure having excellent bonding strength between the metal member and the thermoplastic resin member can be realized by the interaction as above.

That is, according to the present embodiment, it is possible to obtain a composite structure in which the metal member and the thermoplastic resin member are directly and firmly bonded to each other without using an adhesive. Application examples of such a composite structure include a housing for an electronic device, in which an outer shell is formed by pressing and integrating one metal piece (second metal member) to and with a composite structure in which a packing formed of a thermoplastic resin member is bonded to a peripheral edge part of the other metal piece (first metal member), with the packing interposed therebetween.

Such a housing for an electronic device is excellent in bondability of the packing to the metal member, and work of forming a groove in the first metal member and then mounting the packing in the groove is omitted. Therefore, it is possible to reduce complexity of packing mounting work.

<Metal Member>

[Metal Kind of Metal Member]

In the present embodiment, as a kind of metal forming the metal member, at least one selected from the group consisting of iron, stainless steel, aluminum, an aluminum alloy, magnesium, a magnesium alloy, copper, a copper alloy, titanium, and a titanium alloy is preferable. Among these, the iron, the stainless steel, the aluminum alloy, the magnesium alloy, the copper alloy, and the titanium alloy are more preferable, and the stainless steel, the aluminum alloy, the magnesium alloy, and the copper alloy are even more preferable.

The metal member is preferably obtained by subjecting a metal material to a surface roughening treatment, which will be described later, after being processed into a predetermined shape by plastic processing by cutting or pressing; punching processing; and thinning processing such as cutting, polishing, and electric discharge machining. In short, it is preferable to use a metal member processed into a required shape by various processing methods.

[Fine Uneven Structure on Surface of Metal Member]

The metal member according to the present embodiment has a fine uneven structure at least on a metal surface to which the thermoplastic resin member is bonded.

In the metal member according to the present embodiment, from a viewpoint of further improving the bonding strength between the metal member and the thermoplastic resin member, an average length ($RS_m$) of a roughness curve element of the metal surface over which the fine uneven structure is formed, the average length being measured in accordance with JIS B0601: 2001, is preferably 10 nm to 500 μm, more preferably 30 nm to 200 μm, and particularly preferably 50 nm to 150 μm.

In addition, in the metal member according to the present embodiment, from a viewpoint of further improving the bonding strength between the metal member and the thermoplastic resin member, a ten-point average roughness ($R_{zjis}$) of the metal surface on which the fine uneven structure is formed, the ten-point average roughness being measured in accordance with JIS B0601: 2001, is preferably 10 nm to 300 µm, more preferably 10 nm to 100 µm, even more preferably 30 nm to 50 µm, and particularly preferably 50 nm to 30 µm.

Hereinafter, a process of roughening the surface of the metal member will be described.

A method of imparting the fine uneven structure to the surface of the metal member is roughly classified into the following three kinds of methods according to shapes of a fine uneven structure to be obtained.

The first method is a method of immersing the metal member in an erosive aqueous solution or an erosive suspension. A surface of the metal member obtained by this method is covered with innumerable uneven parts when observed with an electron microscope. For example, the average length ($RS_m$) of the roughness curve elements of the uneven parts is 10 nm to 300 µm, and the ten-point average roughness ($R_{zjis}$) thereof is 10 nm to 30 µm.

The second method is a method of roughening the metal member by an anodizing method. A surface of the metal member obtained by this method is mainly formed of a metal oxide layer, and a surface layer thereof is covered with, for example, innumerable openings having a number average inner diameter of 10 to 200 nm.

The third method is a method of forming unevenness on the surface of the metal member by pressing a die punch having unevenness produced by mechanical cutting such as diamond abrasive grain grinding or blasting, or a method of producing an uneven shape on the surface of the metal member by sandblasting, knurling, laser processing, and the like. A width of the recessed part on the surface of the metal member obtained by this method is, for example, 1 to 100 µm.

Among these, the metal member obtained by immersing the metal in the erosive aqueous solution or the erosive suspension using the first method is preferable, because it is possible to process a wide range of metal materials together.

Examples of the method for forming the fine uneven structure include a method of immersing a metal member in an aqueous solution of an inorganic base such as NaOH and/or an aqueous solution of an inorganic acid such as hydrochloric acid or nitric acid; a method of processing a metal member by an anodizing method; a method of immersing a metal member in one or more aqueous solutions selected from hydrated hydrazine, ammonia, and a water-soluble amine compound, as disclosed in Pamphlet of International Publication No. WO 2009/31632; and a method of immersing a metal member (magnesium alloy) in citric acid and then treating with an aqueous solution of potassium permanganate, as described in Japanese Patent No. 5129903. These methods are appropriately used depending on the metal kind of the metal member to be used and the shape of the unevenness.

<Thermoplastic Resin Member>

The thermoplastic resin member according to the present embodiment is characterized in that a hardness measured by a type A durometer (hereinafter, also referred to as a type A durometer hardness) in accordance with JIS K6253 is in a range A60 to A95, and an acid value of the thermoplastic resin member is in a range of equal to or more than 1 mgKOH/g and equal to or less than 100 mgKOH/g.

The type A durometer hardness of the thermoplastic resin member according to the present embodiment is in the range of A60 to A95, preferably A65 to A90, and more preferably A70 to A85. When the durometer hardness satisfies the above range, a sufficient sealing function due to a repulsive stress of the thermoplastic resin member is secured. Note that, the type A durometer hardness is a kind of indentation hardness, and is a measurement method often used for rubbers or elastomers, and a measurement procedure and the like are specified in detail in JIS K6253.

The thermoplastic resin member preferably contains a carboxylic acid group and/or an acid anhydride group, and an acid value thereof is in the range of 1 mgKOH/g to 100 mgKOH/g, preferably 1 mgKOH/g to 85 mgKOH/g, more preferably 2 mgKOH/g to 85 mgKOH/g, even more preferably 2 mgKOH/g to 70 mgKOH/g, still more preferably 2 mgKOH/g to 50 mgKOH/g, and particularly preferably 2 mgKOH/g to 30 mgKOH/g. Note that, in the present embodiment, the carboxylic acid group and/or the acid anhydride group are chemically bonded in a polymer chain.

When the acid value is equal to or more than the lower limit value, sufficient bonding strength between the resin member and the metal member is secured, and when the acid value is equal to or less than the upper limit value, an occurrence of turbidity of the resin member can be suppressed. For example, in order to color the packings formed of the resin member to impart a design, it is desirable that a resin is almost transparent, and turbidity of the resin is not preferable.

The thermoplastic resin member according to the present embodiment is basically synonymous with a thermoplastic resin composition injected onto the metal member when a composite is manufactured by an injection molding method which will be described later. Therefore, in a case where it is required to obtain a thermoplastic resin member that satisfies both the durometer hardness characteristic and the acid value, the thermoplastic resin member may be prepared by preparing a thermoplastic resin composition having the durometer hardness characteristic and the acid value.

A method for preparing the thermoplastic resin composition according to the present embodiment is not particularly limited, and examples thereof can include a method of graft-polymerizing an unsaturated carboxylic acid such as acrylic acid and methacrylic acid, and an acid anhydride such as a maleic anhydride on the thermoplastic resin; a method of producing a thermoplastic resin in the presence of acrylic acid or methacrylic acid; and a method for preparing a thermoplastic resin composition that satisfies the above hardness range and the acid value range by blending a so-called "acid-modified polymer" containing a carboxylic acid group and/or an acid anhydride group with a thermoplastic resin.

In a case where the thermoplastic resin is a polar group-containing polymer such as a polyurethane resin, a polyester resin, a polystyrene resin, a polyvinyl chloride resin, or a polyamide resin, it is difficult or impossible to chemically introduce the carboxylic acid group and/or the acid anhydride group in many cases in terms of reaction operation in general. Therefore, a blending method, that is, a method in which a specific thermoplastic resin is selected as a matrix resin and an acid-modified polymer is physically blended or alloyed is typically preferably adopted.

The thermoplastic resin member according to the present embodiment preferably contains a thermoplastic elastomer (hereinafter, may be abbreviated as TPE), and more preferably contains a thermoplastic elastomer and an acid-modified polymer. As a result, it is possible to realize a more excellent composite structure due to the bonding strength between the metal member and the thermoplastic resin member.

The reason for this is not clear, but the following reasons are considered. First, it is considered that an appropriate elastic function expressed by local physical restraint of a molecular motion of a soft segment skeleton such as a polyether structure, which forms the thermoplastic elastomer in the thermoplastic resin member by a hard segment optimizes the penetration into the fine uneven structure formed on the surface of the metal member and contributes to an improvement of the mechanical strength of the thermoplastic resin member that has penetrated into the fine uneven structure. That is, it is considered that due to the thermoplastic resin member contains the thermoplastic elastomer formed the hard segment and the soft segment, a balance between the penetration amount of the thermoplastic resin member into the fine uneven structure and a strength of the thermoplastic resin member is optimized to bring about the improvement of the bonding strength.

In the thermoplastic resin member according to the present embodiment, a content of the thermoplastic elastomer is preferably equal to or more than 50% by mass.

In a case where the thermoplastic resin member according to the present embodiment contains the acid-modified polymer, it is preferable that in the thermoplastic resin member, the content of the thermoplastic elastomer is equal to or more than 50% by mass and equal to or less than 99% by mass, and the content of the acid-modified polymer is equal to or more than 1% by mass and equal to or less than 50% by mass, and it is more preferable that in the thermoplastic resin member, the content of the thermoplastic elastomer is equal to or more than 60% by mass and equal to or less than 95% by mass, and the content of the acid-modified polymer is equal to or more than 5% by mass and equal to or less than 40% by mass. Here, the total of the thermoplastic elastomer and the acid-modified polymer contained in the thermoplastic resin member is 100% by mass.

Note that, the thermoplastic resin member according to the present embodiment may contain other additives, and examples of such optional additives include an organic colorant, an inorganic pigment, a heat stabilizer, an antioxidant, a weather-resistant stabilizer, a flame retardant, a plasticizer, a lubricant, a release agent, and an antistatic agent.

The TPE according to the present embodiment is an elastic material that does not need to be vulcanized, such as rubber, and is a material generally formed of a hard component (hard and rigid component) and a soft component (soft and flexible component). There are many kinds of the TPE, and examples of the TPE used in the present embodiment can include an olefin-based TPE, a styrene-based TPE, a polyester-based TPE, a urethane-based TPE, and an amide-based TPE. Among these TPEs, from a viewpoint of an adhesive strength, a sealing property, acid resistance, airtightness of the bonding surface, and flexibility as packing, or a repulsion property, a TPE containing the urethane-based TPE (hereinafter, may be referred to as a thermoplastic polyurethane (TPU)) is preferable, and a TPE containing both the TPU and an amide-based TPE (hereinafter, may be referred to as a thermoplastic polyamide (TPAE)) is even more preferable.

In a case where the thermoplastic resin member according to the present embodiment contains the TPU and the TPAE, a total content of the TPU and the TPAE in the thermoplastic resin member is, for example, equal to or more than 60% by mass and equal to or less than 100% by mass, preferably equal to or more than 65% by mass and equal to or less than 95% by mass, and more preferably equal to or more than 70% by mass and equal to or less than 95% by mass. When the total content of the TPU and the TPAE in the thermoplastic resin member is equal to or more than 60% by mass, an elastic function required for a sealing material such as packing can be improved, which is preferable.

In the present embodiment, the content of the TPU in the TPE is, for example, equal to or more than 70% by mass and less than 100% by mass, preferably equal to or more than 70% by mass and equal to or less than 99% by mass, and more preferably equal to or more than 75% by mass and equal to or less than 98% by mass, and the content of the TPAE is, for example, more than 0% by mass and equal to or less than 30% by mass, preferably equal to or more than 1% by mass and equal to or less than 30% by mass, and more preferably equal to or more than 2% by mass and equal to or less than 25% by mass. By setting the content of the TPU in the TPE to be equal to or more than the above lower limit value, the acid resistance of the thermoplastic resin member according to the present embodiment can be secured. Also, by setting the content of the TPAE in the TPE to be within the above range, a fine dispersion of the thermoplastic resin member is promoted while improving elasticity of the thermoplastic resin member. Therefore, it is also possible to improve the bonding strength with metal and improve moldability by improving melt fluidity of the thermoplastic resin member.

The TPU is, for example, a multi-block polymer formed of a hard segment including diisocyanate and a short chain glycol (chain extender) and a soft segment mainly including a polymer glycol having a number average molecular weight of about 1000 to 4000.

Examples of the diisocyanate include aromatic isocyanates typified by 4,4'-diphenylmethane diisocyanate (MDI). Aliphatic isocyanates such as hexamethylenediisocyanate (HDI) are also appropriately used in applications requiring weather resistance.

Examples of the short-chain glycol include ethylene glycol, 1,3-propanediol, 1,4-butanediol, 1,5-pentanediol, 1,6-hexanediol, diethylene glycol, tetraethylene glycol, neopental glycol, 1,4-cyclohexanedimethanol, 1,4-bishydroxyethylhydroquinone, and mixtures thereof.

Examples of the polymer glycol include a polyether polyol typified by polytetramethylene ether glycol (PTMEG), a polyester polyol which is a condensation system of adipic acid and an aliphatic or aromatic glycol, and a polycaprolactone polyol obtained by ring-opening polymerization of ε-caprolactone.

The TPU is classified into ether-based, adipate ester-based, caprolactone-based, and carbonate-based TPUs depending on what kind of component is used as the diisocyanate component, the short chain glycol, and the polymer glycol. However, in the present embodiment, as long as the type A durometer hardness of the thermoplastic resin member according to the present embodiment satisfies the range of A60 to A95, the above-described TPUs can be used without limitation. In a case where the composite structure according to the present embodiment is exposed to an acidic atmosphere, the ether-based TPU or the ester-based TPU is preferably used, and the ether-based TPU is more preferably used.

Various TPUs are commercially available from many companies under various brand names, for example, RESAMINE P (trademark) of Dainichiseika Color & Chemicals Mfg. Co., Ltd., PANDEX (trademark) of DIC Covestro Polymer Ltd., Miractran (trademark) of Tosoh Corporation, PELLETHANE (trademark) of Dow Chemical Company, ESTANE (trademark) of B. F. Goodrich Company, and DESMOPAN (trademark) of Bayer AG are commercially available. These commercially available products can be used without limitation.

The TPAE refers to a thermoplastic resin material including a copolymer having a polymer forming a crystalline hard segment having a high melting point and a polymer forming an amorphous soft segment having a low glass transition temperature, and has an amide bond (—CONH—) in the main chain of the polymer forming the hard segment. Examples of the TPAE include amide-based thermoplastic elastomers defined in JIS K6418: 2007 or polyamide-based elastomers described in Japanese Unexamined Patent Publication No. 2004-346273.

Examples of the TPAE include a material in which at least a polyamide forms a crystalline hard segment having a high melting point, and other polymers (for example, polyester or polyether) form an amorphous soft segment having a low glass transition temperature. In addition, as the TPAE, a chain length extender such as a dicarboxylic acid may also be used, in addition to the hard segment and the soft segment. Examples of the polyamide forming the hard segment can include polyamides produced by w-aminocarboxylic acid or lactam.

Examples of the ω-aminocarboxylic acid can include aliphatic ω-aminocarboxylic acids having 5 to 20 carbon atoms, such as 6-aminocaproic acid, 7-aminoheptanoic acid, 8-aminooctanoic acid, 10-aminocapric acid, 11-aminoundecanoic acid, and 12-aminododecanoic acid. Also, examples of the lactam include aliphatic lactams having 5 to 20 carbon atoms such as lauryl lactam, ε-caprolactam, udecan lactam, ω-enantholactam, and 2-pyrrolidone.

As the polyamide forming the hard segment, a polyamide obtained by ring-opening polycondensation of lauryl lactam, ε-caprolactam, or udecan lactam can be preferably used.

In addition, examples of the polymer forming the soft segment include polyester and polyether. Examples of the polyether include polyethylene glycol, prepropylene glycol, polytetramethylene ether glycol, and ABA-type triblock polyether. These can be used alone or two or more kinds thereof can be used. Also, a polyether diamine or the like obtained by reacting ammonia or the like with an end of the polyether can be used.

Examples of the combination of the hard segment and the soft segment can include the respective combinations of the hard segments and the soft segments mentioned above. Among these, a combination of the lauryl lactam ring-opening polycondensate/polyethylene glycol, a combination of the lauryl lactam ring-opening polycondensate/polypropylene glycol, a combination of the lauryl lactam ring-opening polycondensate/polytetramethylene ether glycol, and a combination of the lauryl lactam ring-opening polycondensate/ABA type triblock polyether are preferable, and the combination of the lauryl lactam ring-opening polycondensate/ABA type triblock polyether is particularly preferable.

A number average molecular weight of the polymer (polyamide) forming the hard segment is preferably 300 to 15,000 from the viewpoint of melt moldability. In addition, a number average molecular weight of the polymers forming the soft segment is preferably 200 to 6,000 from the viewpoint of toughness and low temperature flexibility. Further, a mass ratio (x:y) of the hard segment (x) and the soft segment (y) is preferably 50:50 to 90:10, and further preferably 50:50 to 80:20 from the viewpoint of moldability.

The TPAE can be synthesized by copolymerizing the polymer forming the hard segment and the polymer forming the soft segment by a known method.

As the TPAE, for example, Arkema Pebax 33 Series of Arkema S.A. (for example, 7233, 7033, 6333, 5533, 4033, MX1205, 3533, and 2533), "UBESTA XPA" series of Ube Industries (for example, XPA9063X1, XPA9055X1, XPA9048X2, XPA9048X1, XPA9040X1, and XPA9040X2), and "VESTAMID" series of Daicel-Evonik Ltd. (for example, E40-S3, E47-S1, E47-S3, E55-S1, E55-S3, EX9200, and E50-R2) can be used.

The thermoplastic resin member according to the present embodiment further contains an acid-modified polymer. A content of the acid-modified polymer in the thermoplastic resin member according to the present embodiment is preferably equal to or more than 1 part by mass and equal to or less than 35 parts by mass, more preferably equal to or more than 3 parts by mass and equal to or less than 30% by mass, and even more preferably equal to or more than 5 parts by mass and equal to or less than 25% by mass, with respect to a total of 100 parts by mass of the TPU and the TPAE.

The present inventors confirmed that the melt fluidity of the thermoplastic resin composition is improved by containing the acid-modified polymer to be equal to or more than the above lower limit value, as will be mentioned in examples to be described later. For example, in a case where the composite structure according to the present embodiment is produced by injection molding, a molten resin composition that has flowed into a cavity through a sprue, a runner, and a gate moves in the cavity and fills the cavity. Even when a temperature of the molten resin composition is lowered in this process, the resin fluidity of the thermoplastic resin composition containing the acid-modified polymer is secured. Therefore, by using the thermoplastic resin composition containing the acid-modified polymer, it is possible to obtain a composite structure having high bonding strength even in a case of using a mold having a long moving distance of the molten resin.

It is not clear the reason why the thermoplastic resin composition containing the TPU and the TPAE improves the melt fluidity by containing the acid-modified polyolefin. However, the present inventors confirmed, by morphological observation, that the fine dispersion of the urethane layer in the TPU is promoted by blending the acid-modified polyolefin with the TPU. Presumably, it is considered that the microdispersion phenomenon efficiently delocalizes polar groups (acid groups) in the resin composition and increases contact points with the metal surface, resulting in an improvement in the bonding strength between the resin and metal. In a case where the TPU is the ether-based TPU containing an ether bond, it is considered that the fine dispersion is further promoted by coexistence with the TPAE containing the amide bond compatible with an ether group, not only improved bonding strength, but also improved resin fluidity were obtained.

The acid-modified polymer according to the present embodiment is, for example, a polymer containing a carboxylic acid and/or a carboxylic acid anhydride group. In the present embodiment, as the acid-modified polymer, an acid-modified polyolefin resin containing an olefin component and a skeleton derived from an unsaturated carboxylic acid component is preferably used.

As the olefin component that is the main component of the acid-modified polyolefin resin, ethylene or α-olefin such as propylene, 1-butene, 1-pentene, 1-hexene, 4-methyl-1-pentene, 1-heptene, 1-octene, 1-nonene, 1-decene, 1-undecene, and 1-dodecene is preferable, and a mixture thereof may be used. Among these, the ethylene, the propylene, and the 1-butene are particularly preferable from the viewpoint of adhesion, water resistance, or the like.

Examples of the unsaturated carboxylic acid forming the acid-modified polyolefin resin include acrylic acid, methacrylic acid, maleic acid (anhydride), itaconic acid (anhydride), aconitic acid (anhydride), fumaric acid, crotonic acid, citraconic acid, mesaconic acid, and allyl succinic acid. Further, as the unsaturated carboxylic acid, a compound having at least one carboxyl group or an acid anhydride group in a molecule, such as a half ester or half amide of an unsaturated dicarboxylic acid, can be used. Among these, the maleic acid (anhydride), the acrylic acid, and the methacrylic acid are preferable, and the maleic anhydride is more preferable, from the viewpoint of ease of introduction into a polyolefin resin. Note that, "-acid (anhydride)" refers to a "-acid or -acid anhydride". That is, the maleic acid (anhydride) refers to maleic acid or a maleic anhydride.

A copolymerization form of the unsaturated carboxylic acid and the olefin component is not limited, and examples thereof include random copolymerization, block copolymerization, and graft copolymerization. The graft copolymerization is preferable from the viewpoint of ease of polymerization.

In the present embodiment, specific examples of the acid-modified polyolefin resin include an ethylene/(meth)acrylic acid copolymer; an ethylene/α-olefin/maleic acid (anhydride) copolymer such as an ethylene/propylene/maleic acid (anhydride) copolymer, an ethylene/1-butene/maleic acid (anhydride), and an ethylene/propylene/1-butene/maleic acid (anhydride) copolymer; a propylene/α-olefin/maleic acid (anhydride) copolymer such as a propylene/1-butene/maleic acid (anhydride) copolymer and a propylene/octene/maleic acid (anhydride) copolymer; an ethylene/(meth)acrylic acid ester/maleic acid (anhydride)copolymer; an ethylene/maleic acid (anhydride) copolymer; and a propylene/maleic acid (anhydride) copolymer. These may be used alone or two or more kinds thereof may be used in combination.

The acid-modified polyolefin resin according to the present embodiment may contain other constituent units other than the above, if necessary. Examples of the constituent units include (meth)acrylic acid esters such as methyl (meth)acrylate, ethyl (meth)acrylate, and butyl (meth)acrylate; maleic acid esters such as dimethyl maleate, diethyl maleate, and dibutyl maleate; (meth)acrylic acid amides; alkyl vinyl ethers such as methyl vinyl ether and ethyl vinyl ether; vinyl esters such as vinyl formate, vinyl acetate, vinyl propionate, vinyl pivalate, vinyl versatic acid; vinyl alcohol obtained by saponifying vinyl esters with a basic compound or the like; 2-hydroxyethyl acrylate; glycidyl (meth)acrylate; (meth)acrylonitrile; styrene; substituted styrene; vinyl halides; halogenated vinylidenes; carbon monoxide; and sulfur dioxide. A mixture of these may be used. A content of these other constituent units is preferably equal to or less than 10% by mass when a total amount of the acid-modified polyolefin resin is 100% by mass.

Note that, in the present embodiment, as the acid-modified polymer, a (meth)acrylic block copolymer represented by the following general formula (1) obtained by living anionic polymerization can also be used without limitation.

-[a]-[b]-[a]-　　(1)

(In the formula, [a] is a methyl methacrylate polymer block, and [b] is an alkyl (meth)acrylate polymer block in which an alkyl group has 0 to 12 carbon atoms.) Note that, in the present embodiment, the (meth)acrylic refers to acrylic or methacrylic. Also, (meth)acrylate refers to acrylate or methacrylate.

Various acid-modified polymers are commercially available. Examples thereof include NUCREL (trademark) series, which is an acid-modified polyolefin resin manufactured by DU PONT-MITSUI POLYCHEMICALS CO., LTD., HIMILAN (trademark) series, which is an ionomer resin of the same, KURARITY (trademark) series, which is an acrylic block copolymer manufactured by KURARAY CO., LTD., MODIC (trademark) series, which is an acid-modified polyolefin resin manufactured by Mitsubishi Chemicals, Inc., ADMER (trademark) series, which is an acid-modified polypropylene manufactured by Mitsui Chemicals, Inc., REXPEARL (trademark) series, which is an acid-modified polyethylene resin manufactured by Japan polyethylene Corporation, and BONDINE (trademark) series, which is a maleic anhydride-modified polyolefin resin manufactured by Arkema S.A. Since the acid value of these acid-modified polymers, measured by the method specified in JIS K0070 is approximately 1 to 1000 mgKOH/g, the thermoplastic resin and one or more acid-modified polymers may be appropriately blended (alloyed) so that the acid value of the thermoplastic resin member or the thermoplastic resin composition according to the present embodiment is within a desired range.

As a method for preparing the thermoplastic resin composition, for example, a known method of dry-blending or melt-mixing a thermoplastic resin and an acid-modified polymer, and an optional an additive component if necessary, using a known mixing device such as a Banbury mixer, a Henshall mixer, a single-screw extruder, a twin-screw extruder, and a high-speed twin-screw extruder can be used without limitation.

<Composite Structure>

The composite structure according to the present embodiment includes the metal member, and the thermoplastic resin member bonded to the metal member. More specifically, the composite structure according to the present embodiment is obtained by bonding the thermoplastic resin composition which is a raw material component forming the thermoplastic resin member described above to a specific fine uneven structure part (a surface roughened part) formed on the metal member by penetrating.

In a general related art, in a case where a composite structure including a metal member and an elastomer member is produced, in the elastomer member, a crosslinkable elastomer is crosslinked in advance, and an elastomer member obtained by shaping and a metal member are bonded to each other using an adhesive. In the method, the bonding between the two members tends to have relatively low strength because the bonding is based on the chemical bonding force mediated by the adhesive. Also, when the adhesive component deteriorates due to an external factor such as moisture and light, there is a concern that the bonding strength is significantly reduced.

On the other hand, in the present embodiment, the thermoplastic resin composition, preferably the thermoplastic resin composition containing the thermoplastic elastomer has an appropriate hardness and acid value. Therefore, the thermoplastic resin composition can easily penetrate into the fine uneven structure formed on the surface of the metal member. Further, in this state, it is expected that a polar group (for example, a carboxyl group or a hydroxyl group) chemically bonded to the resin skeleton causes an ionic bond interaction with the surface of the metal member. That is, since a more chemical interaction is expressed in addition to the physical bonding force (anchor effect), it is possible to increase the bonding strength.

(Method for Producing Composite Structure)

The composite structure can be produced by bonding the thermoplastic resin composition to the roughened metal member while forming the thermoplastic resin composition so that the thermoplastic resin member has a desired shape.

As the method of bonding and integrating the thermoplastic resin member onto the metal member, various known molding methods such as injection molding, extrusion molding, heat press molding, compression molding, transfer molding, casting molding, laser welding molding, reaction injection molding (RIM molding), lim molding, and spray molding can be adopted without limitation. Among these, as a method for producing the composite structure, the injection molding method is preferable from the viewpoint of productivity. Specifically, it is preferable that the composite structure is produced by the injection molding method in which a metal member is inserted into a cavity part of an injection mold, and the thermoplastic resin composition is injected into a mold. Specific examples thereof include the following methods.

First, a mold for injection molding is prepared, the mold is opened, and a metal member is installed in a part of the mold. Then, the mold is closed, and the thermoplastic resin composition is injected into the mold and solidified so that at least a part of the thermoplastic resin composition is in contact with a roughened region on the surface of the metal member. Thereafter, the composite structure can be obtained by opening and releasing the mold.

In addition, at the time of the injection molding, it is preferable to use high-speed heat cycle molding (RHCM, heat & cool molding) in which the mold is rapidly heated and cooled. This is because the bonding strength between the metal and the resin can be increased by adopting the high-speed heat cycle molding.

Specifically, a method in which a surface temperature of the mold is maintained at a temperature of 250° C. to 300° C. from the start of injection of the thermoplastic resin composition to the completion of pressure keeping, and then the mold is cooled up to the surface temperature of 170° C. to 230° C. can be exemplified.

In the present embodiment, the composite structure may be formed by injection foam molding. Examples of the method of injection foam molding include a method of adding a chemical foaming agent to a resin, a method of directly injecting nitrogen gas or carbon dioxide gas into a cylinder part of an injection molding machine, or a MuCell injection foam molding method in which nitrogen gas or carbon dioxide gas is injected into a cylinder of an injection molding machine in a supercritical state. In any of the methods, a composite structure in which the resin member is a foam can be obtained. In addition, in any of the methods, as a mold control method, it is possible to use counter pressure or use a core bag depending on a shape of a molded product.

(Use of Composite Structure)

The composite structure according to the present embodiment has high productivity and a high degree of freedom in shape control, and thus can be developed into various uses.

Examples of the uses include a housing for an electronic device, to which a seal member such as a waterproof packing, a vacuum packing, and a packing for a pressure device is bonded; a stress relief member; a member for a portable device; a member for a solar cell; a member for a lithium ion battery; a member for housing construction; a member for a vehicle; and an aerospace member.

More specifically, a housing which is for an electronic device and to which a waterproof sealing material for mobile devices such as a mobile phone, a smartphone, a tablet, hard disk drive, a digital camera, and a watch is bonded; a waterproof sealing material for home appliances such as a washing machine and a pot; a fuel battery gasket; a packing for a lithium ion battery; and the like are exemplified.

(Housing for Electronic Device)

The composite structure according to the present embodiment can be suitably used for a housing for an electronic device.

The housing for an electronic device according to a first embodiment of the present invention includes the composite structure according to the present embodiment, in which the housing for an electronic device has a first metal member 1 (also referred to as one metal piece) and a second metal member 2 (also referred to as the other metal piece), a packing 3 formed of the thermoplastic resin member is bonded to a peripheral edge part of the first metal member 1, and an outer shell is formed by integrating the second metal member 2 with the first metal member 1, with the packing 3 interposed therebetween.

Figure 15:
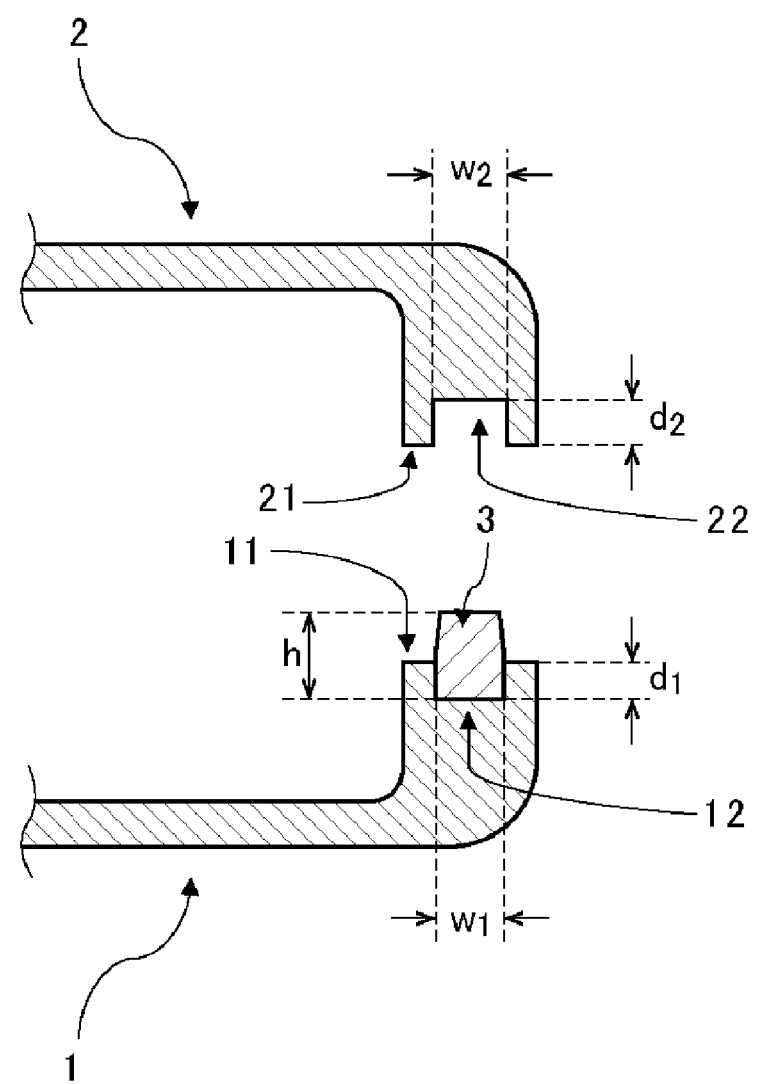
FIG. 15 represents a sectional view schematically showing a vicinity of a bonding part of a housing for an electronic device according to a first embodiment.

That is, in the housing for an electronic device according to the present embodiment, a fitting surface 11 of the composite structure including the first metal member 1 and the packing 3 formed of a thermoplastic resin member bonded to the peripheral edge part of the first metal member 1 and a fitting surface 21 integrated with the first metal member 1 of the other second metal member 2 are pressed so as to compress the packing 3, and the first metal member 1 and the second metal member 2 are fitted and integrated (see FIG. 15).

The housing for an electronic device according to the first embodiment may be configured of three or more metal pieces.

In the present embodiment, the packing 3 bonded to the peripheral edge part of the first metal member 1 is provided around the recessed groove 12 provided in the peripheral edge part so as to fill the recessed groove 12. When a depth of the recessed groove 12 is $d_1$, a height h of the packing preferably satisfies $d_1 < h < 5 \times d_1$. A recessed groove 22 is also provided in the fitting surface 21 paired with the fitting surface 11 in a recessed manner, and both fitting surfaces are fitted so as to be mirror image symmetric and pressed and integrated. Accordingly, it is possible to obtain the housing for an electronic device according to the present embodiment. Typically, it is preferable that an opening width ($w_2$) of the recessed groove 22 is in a range of 1.0 to 1.5 times an opening width ($w_1$) of the recessed groove 12 and a depth ($d_2$) of the recessed groove 22 is shallower than the depth ($d_1$) of the recessed groove 12.

The housing for an electronic device according to a second embodiment of the present invention includes the composite structure according to the present embodiment, in which the housing for an electronic device has a metal member and a plastic member, a packing formed of the thermoplastic resin member is bonded to a peripheral edge part of the metal member, and an outer shell is formed by integrating the metal member with the plastic member, with the packing interposed therebetween.

In the second embodiment, the packing to be bonded to the peripheral edge part of the metal member is provided around the recessed groove provided in the peripheral edge part so as to fill the recessed groove, and a depth of the recessed groove and a height of the packing are the same as in the first embodiment. The recessed groove fitting surfaces provided as necessary in the plastic member or on the plastic member are fitted so as to be mirror image symmetric and pressed and integrated. Accordingly, the housing for an electronic device according to the second embodiment is obtained.

When a packing bonded body formed of a thermoplastic resin member is used as one piece of the housing for an electronic device according to the first and second embodiments, a compression set of the packing at a compression ratio of 25% at a temperature of 25° C. and a test time of 22 hr, specified in JIS K6262 is usually equal to or less than 80%, preferably equal to or less than 70%, and more preferably equal to or less than 60%.

A housing for an electronic device is produced by pressing both pieces so that the fitting surfaces face each other so as to compress the packing, and then fixing the pieces by a known unit. As known fixing unit, it is desirable to adopt a method of snap-fitting a claw part provided at any portion of two pieces or a mechanical fitting unit such as screwing. In such a case of a mechanically fixing the housing, it is possible to easily deal with even a case where the housing is disassembled into two pieces and fitted again in order to deal with unexpected failures of the electronic devices housed in the housing for an electronic device and to perform regular inspections of the electronic devices.

(Cushioning Material for Laptop Personal Computer)

The composite structure according to the present embodiment can be suitably used for a cushioning material of a laptop personal computer. A laptop personal computer usually includes a personal computer main body and a lid connected through a hinge device. A keyboard is arranged on a surface of the main body, and a display is incorporated in the lid. In the laptop personal computer, opening and closing of the lid are performed through a hinge device, but in a case where the lid is closed strongly against the user's will, a case where the lid of the laptop personal computer is strongly pressed by external pressure, or a case where the laptop personal computer main body is dropped, damage to a glass panel of the display built into the lid occurs. In order to prevent this trouble, a method using the composite structure according to the present embodiment as a cushioning material is useful. Specifically, a composite structure in which a packing formed of a thermoplastic resin member is bonded to an aluminum alloy or a magnesium alloy part disposed at least on a peripheral edge part of a surface of the lid, and the packing wraps around the glass surface, for example functions as a cushioning material when the lid is opened and closed or when a strong impact is applied, and helps protect the laptop personal computer.

In a case where a packing bonded body formed of the thermoplastic resin member is used as the cushioning material for the lid of the laptop personal computer, a compression set of the packing at a compression ratio of 25% at a temperature of 25° C. and a test time of 22 hr, specified in JIS K6262 is usually equal to or less than 80%, preferably equal to or less than 70%, and more preferably equal to or less than 60%.

Although some embodiments of the present invention have been described above, these are examples of the present invention and include various configurations other than the above.

Although the embodiments of the present invention have been described above, these are examples of the present invention and include various configurations other than the above.

EXAMPLES

Hereinafter, embodiments of the present invention will be described with reference to examples, but the present embodiments are not limited thereto.

<Various Analysis/Characteristic Evaluation Methods Used in Present Examples>

(Measurement of Ten-Point Average Roughness ($R_{zjis}$) and Average Length ($RS_m$) of Roughness Curve Element of Surface of Metal Member)

Unless otherwise specified, in surface roughness measured in accordance with JIS B0601: 2001 (corresponding ISO4287) using a surface roughness measuring device "SURFCOM 1400D (manufactured by TOKYO SEIMITSU CO., LTD.)", the ten-point average roughness ($R_{zjis}$) and the average length ($RS_m$) of the roughness curve element were measured, respectively. Note that, measurement conditions are as follows.

Radius of stylus tip: 5 μm
Standard length: 0.8 mm
Evaluation length: 4 mm
Measurement velocity: 0.06 mm/sec The measurement was performed on a total of six straight portions on the surface of the metal member, the six straight portions including random three straight portions in a parallel relationship and random three straight portions orthogonal to the straight portion.

(Measurement of Hardness of Thermoplastic Resin Member)

The A hardness 5 seconds after the start of measurement was measured using a type A durometer according to JIS K6253.

(Measurement of Acid Value of Thermoplastic Resin Member)

A sample of a precisely-scaled thermoplastic resin member was dissolved in a mixed solvent of methylene chloride: dimethyl sulfoxide=1:1 (mass ratio) to obtain a sample solution. Then, the acid value of the thermoplastic resin member was measured according to a method specified in JIS K0070. That is, the above sample solution was titrated with a pre-standardized alcohol solution of N/10 potassium hydroxide (obtained by adding 5 g of ion-exchanged water to 7 g of special grade potassium hydroxide, setting 1 L (liter) with primary ethyl alcohol, and calibrating titer=F with N/10 hydrochloric acid and 1% phenolphthalein solution), and the acid value (mgKOH/g) was computed from the neutralized amount.

(Evaluation of Tensile Shear Strength)

Figure 2:
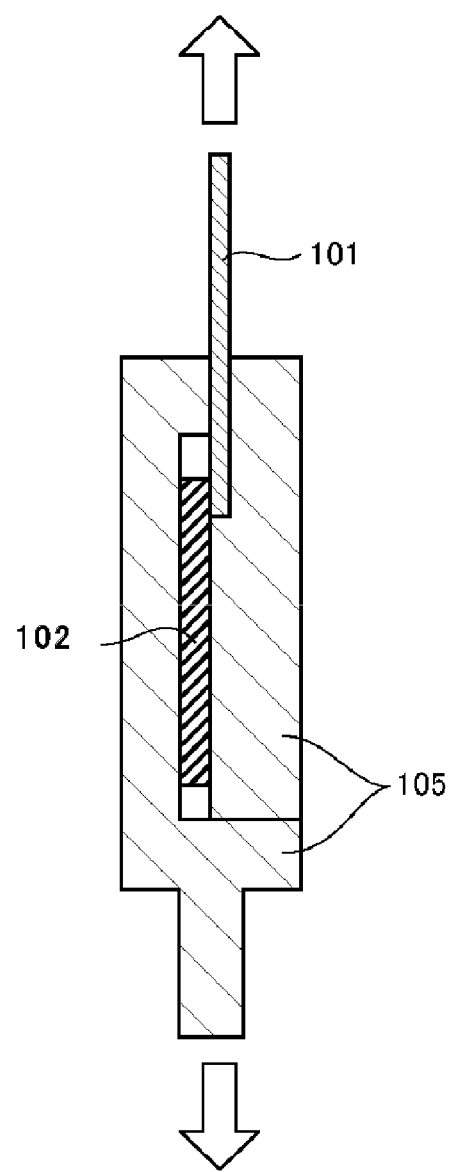
FIG. 2 represents a drawing (sectional view) schematically showing a tensile shear strength test method according to the present embodiment.

The tensile-shear bonding strength of a composite structure sample (dumbbell test piece) produced in each example/comparative Example was evaluated. For evaluating the tensile shear strength, a test piece in which a thermoplastic resin member 102 (width 10 mm×length 50 mm×thickness×3 mm) is bonded to an end 103 (0.5 cm$^2$) of a plate-shaped metal member 101 (width 18 mm×length 45 mm×thickness 2 mm) was used. A model 1323 (manufactured by Aiko Engineering Co., Ltd.) was used as a tensile tester, a dedicated jig 105 containing the test piece was attached to the tensile tester, and the measurement was performed under the conditions of a chuck distance of 60 mm and a tensile velocity of 10 mm/min at a room temperature (23° C.). The tensile shear strength (MPa) was obtained by dividing a breaking load (N) by an area of a metal/resin bonded part (see FIGS. 1 and 2). Note that, the tensile shear strength is an average value of the measured values of five samples.

(90° Peel Strength Measurement)

Figure 4:
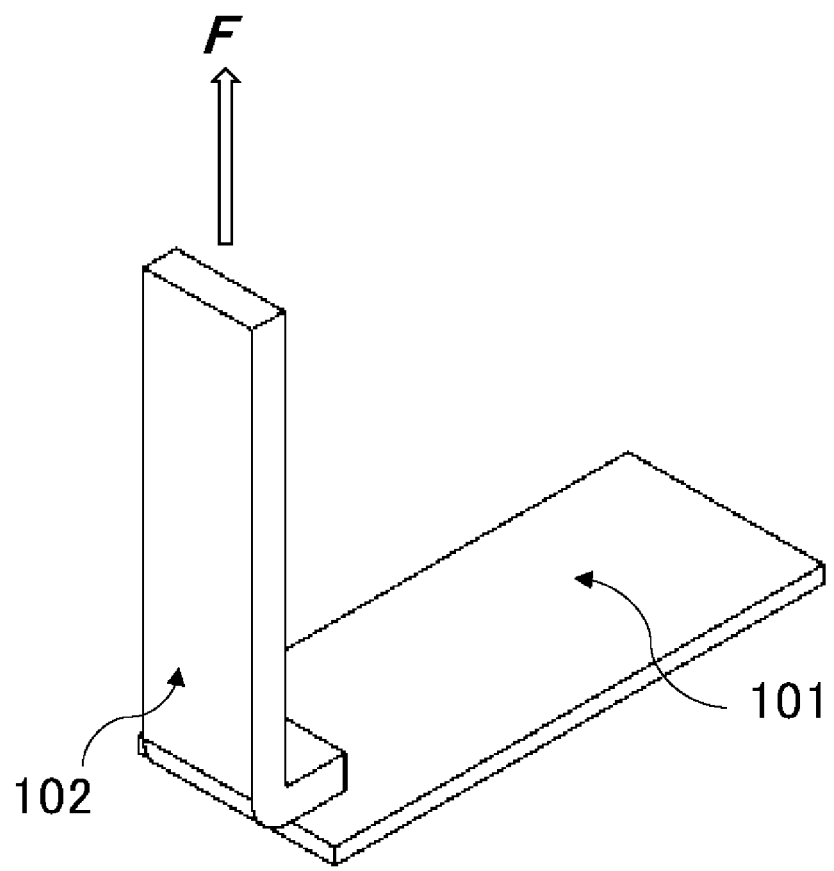
FIG. 4 represents a drawing schematically showing a peel strength test method according to the present embodiment.
Figure 5:
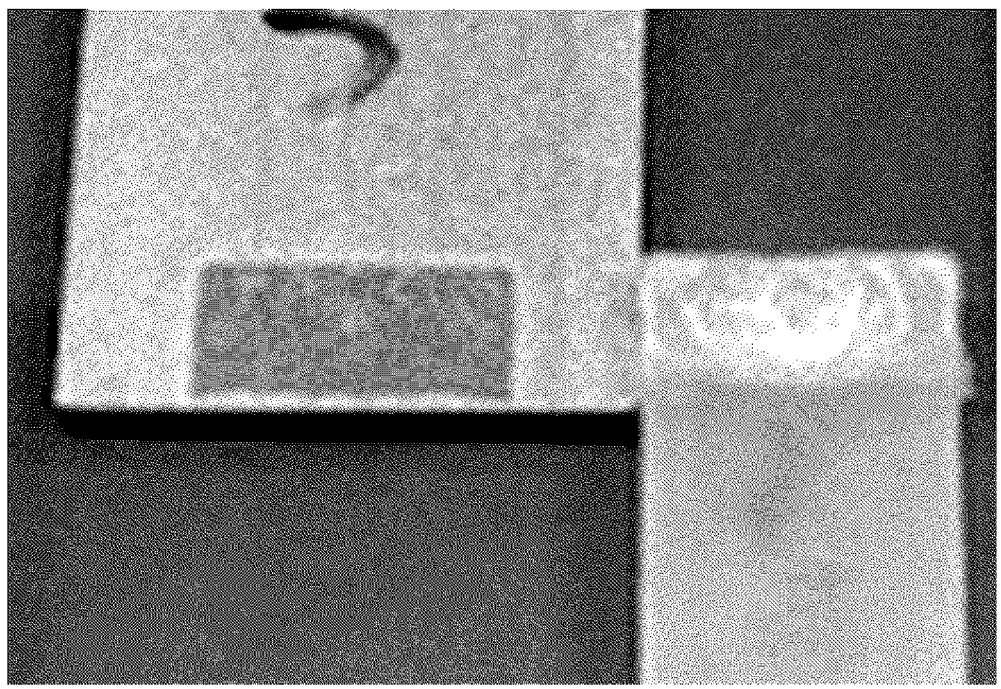
FIG. 5 represents a view showing a photograph of a fracture surface of one of test pieces prepared in Example 1.
Figure 6:
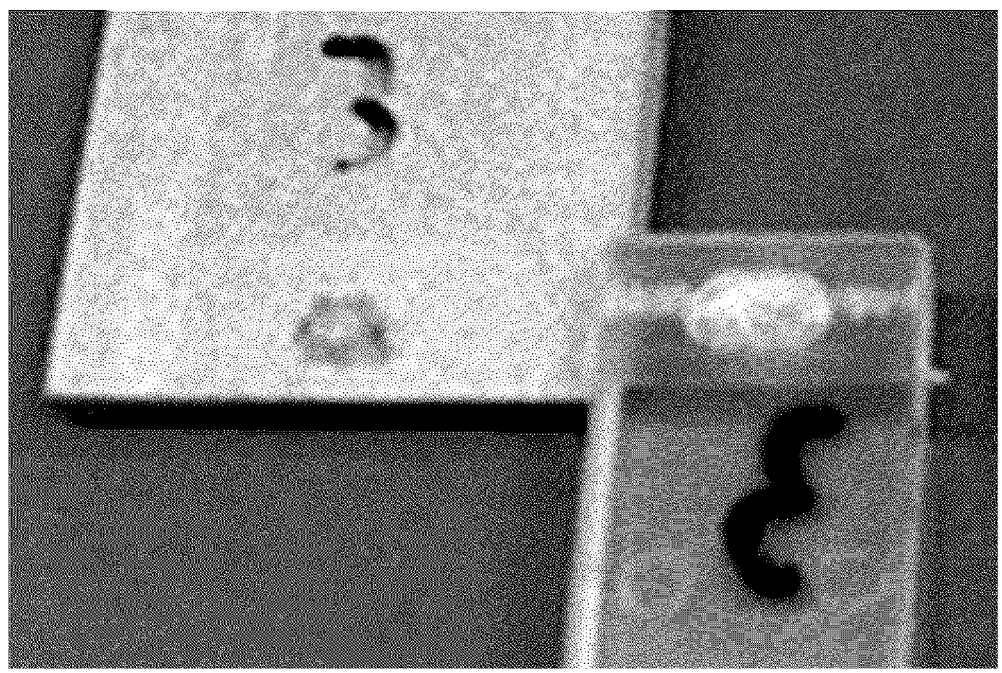
FIG. 6 represents a view showing a photograph of a fracture surface of one of test pieces prepared in Comparative Example 1.
Figure 7:
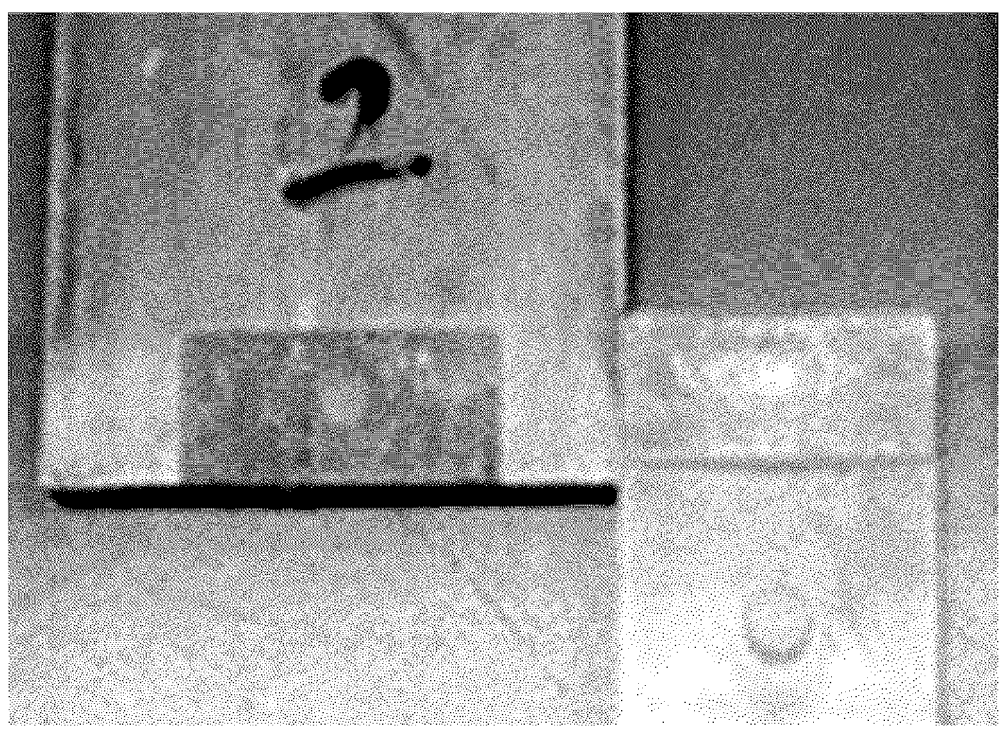
FIG. 7 represents a view showing a photograph of a fracture surface of one of test pieces prepared in Example 5.
Figure 8:
FIG. 8 represents a view showing a photograph of a fracture surface of one of test pieces prepared in Comparative Example 2.
Figure 9:
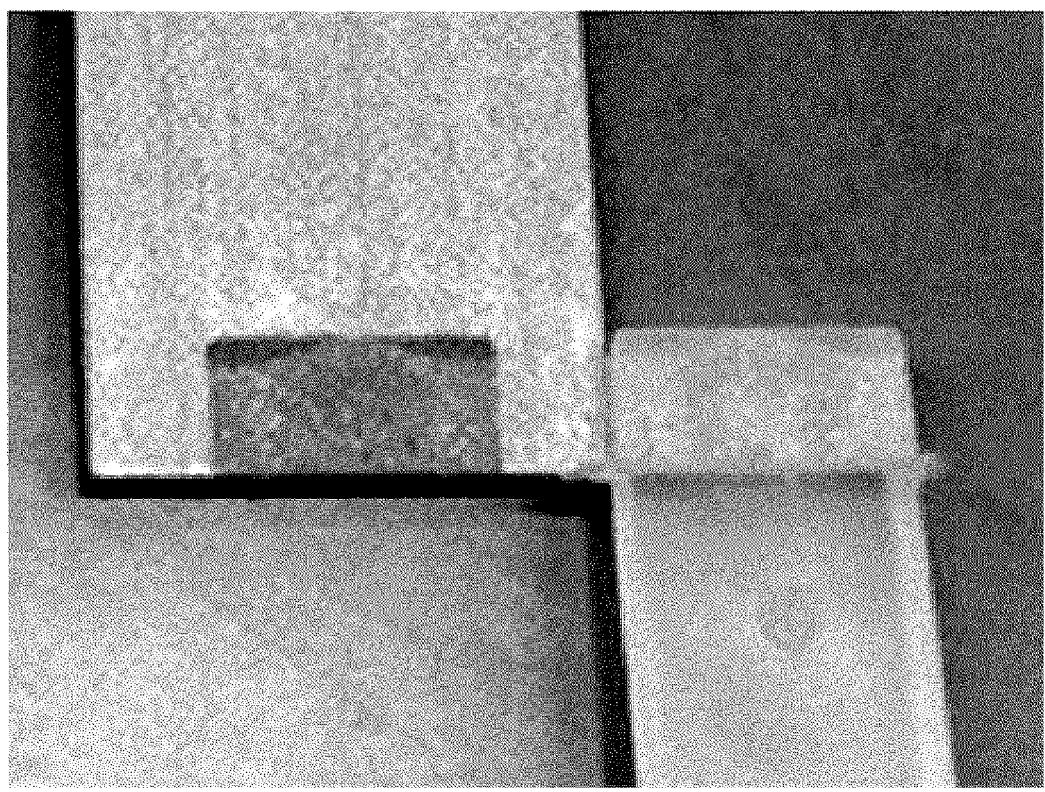
FIG. 9 represents a view showing a photograph of a fracture surface of a test piece prepared in Reference Example 1 after a peel strength test.
Figure 10:
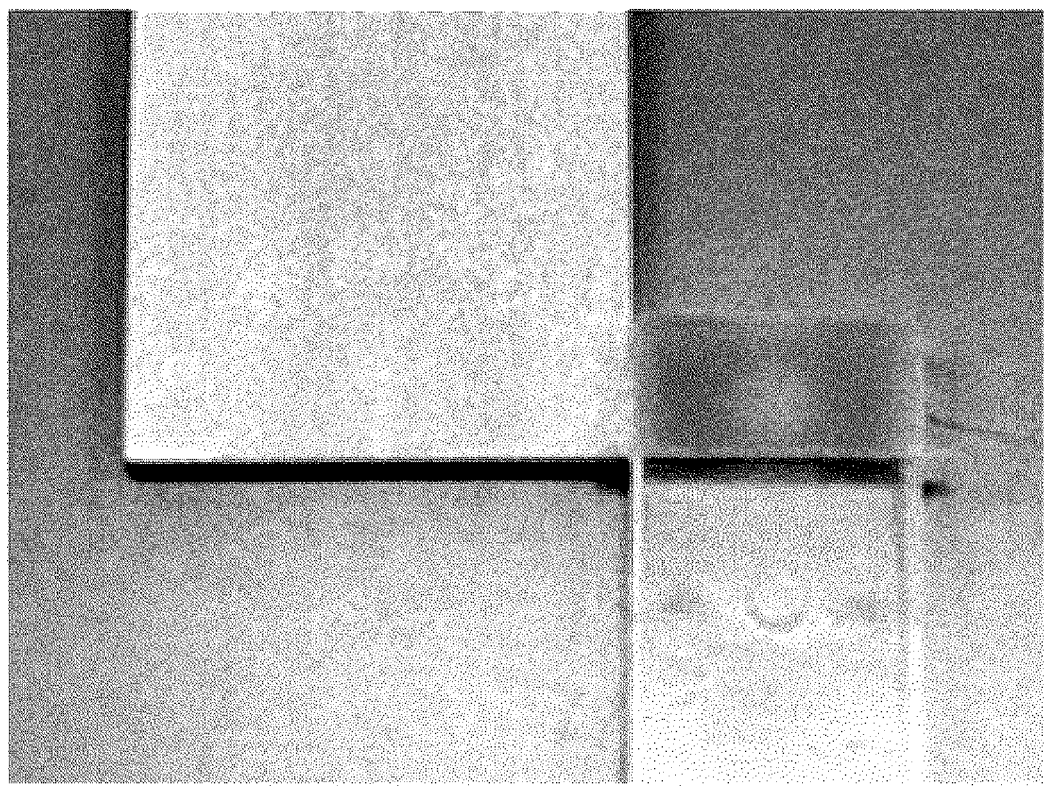
FIG. 10 represents a view showing a photograph of a fracture surface of a test piece prepared in Comparative Example 3 after a peel strength test.
Figure 11:
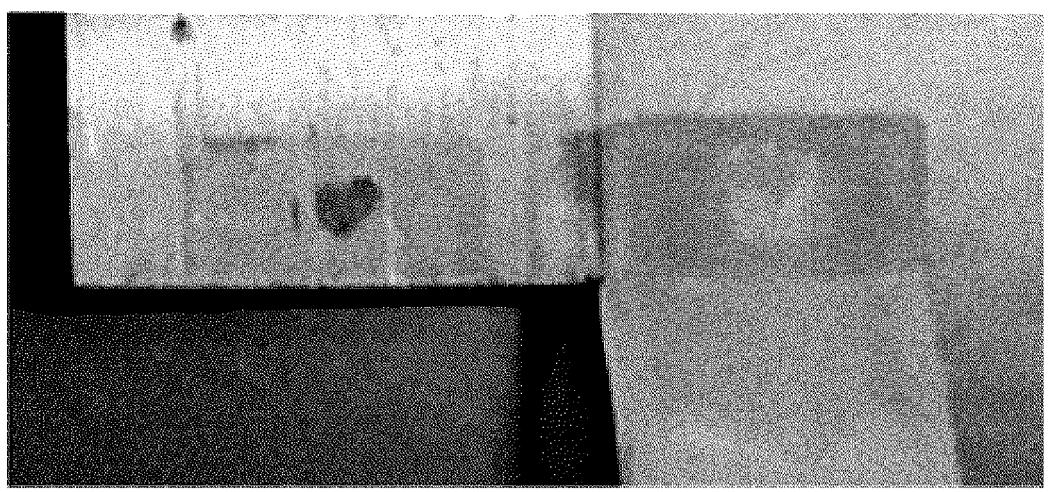
FIG. 11 represents a view showing a photograph of a fracture surface of a test piece prepared in Reference Example 2 after a shear strength test.
Figure 12:
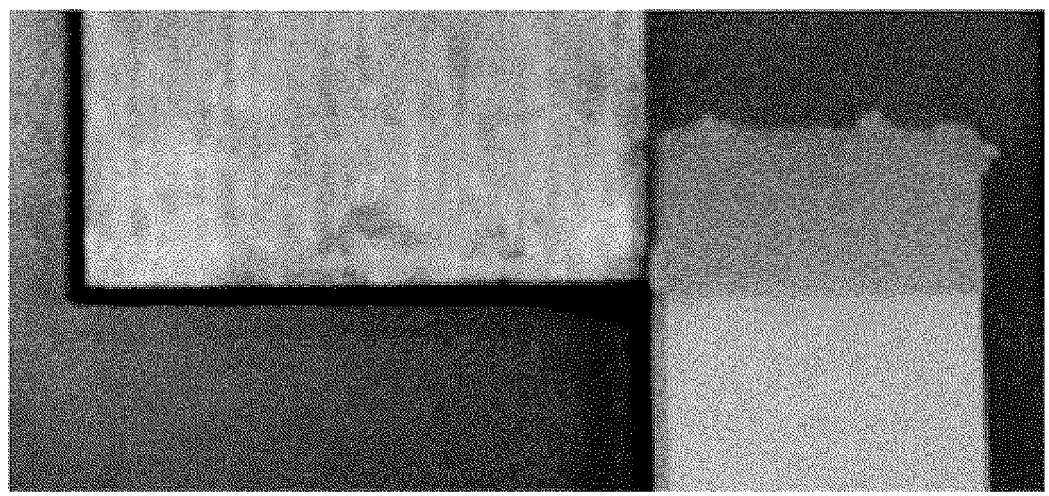
FIG. 12 represents a view showing a photograph of a fracture surface of a test piece prepared in Comparative Example 4 after a shear strength test.
Figure 13:
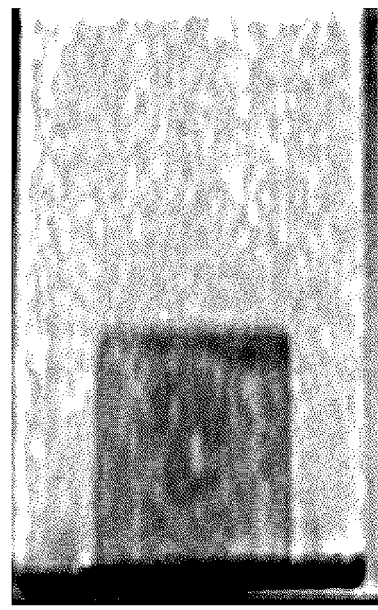
FIG. 13 represents a drawing showing a photograph of a fracture surface of a test piece prepared in Example 9 after a peel strength test.
Figure 14:
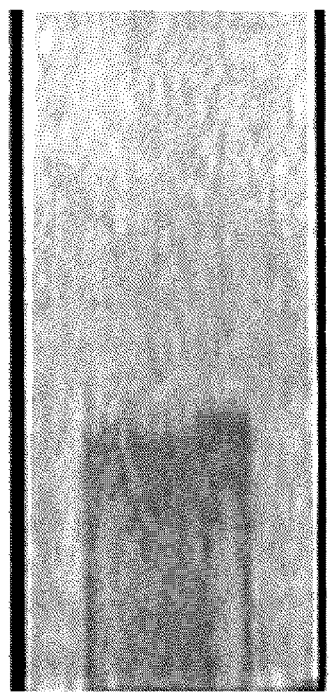
FIG. 14 represents a drawing showing a photograph of an inner metal side of a fracture surface of the test piece prepared in Example 10 after a peel strength test.

A 90° peel strength measurement was performed using the same test piece as the test piece used for the tensile shear strength. The metal member 101 of the test piece was fixed, the end opposite to the bonded part of the thermoplastic resin member 102 was sandwiched between chucks of a 90° peel strength tester, and a peel strength in the 90° direction was measured in the peeling velocity of 100 mm/min at a room temperature (23° C.) (see FIG. 4). A model 1323 (manufactured by Aiko Engineering Co., Ltd.) was used as the tensile tester. Note that, the 90° peel strength is an average value of the measured values of five samples.

(Observation of Fracture Surface after Strength Measurement)

A fracture surface was observed with a magnifier on the metal member 101 side after the 90° peel strength test or the tensile shear strength test. However, regarding the 90° peel strength test here, the fracture surface is obtained in a strength test for a test piece before an alumite treatment, which will be described later. The photographs shown in FIGS. 5 to 14 are photographs obtained by disposing a test piece so that the fracture surface can be seen with the short side of the metal member facing up. A portion where the fracture surface on the metal member side (in FIGS. 5 to 12, the fracture surface on the resin member side was also imaged) was black showed a resin residue, and this portion was regarded as a base material fracture. On the other hand, a gray portion indicates that there is no resin residue, and this portion was determined to be interface fracture. The area of the black portion in the entire area of the bonded part (5 mm×10 mm=0.5 cm$^2$) was measured, the area of equal to or more than 70 area % was determined as a, the area of equal to or more than 50 area %, and less than 70 area % was determined as b, and the area of less than 50 area % was determined as c. a indicates that a base material fracture mode is prioritized, c indicates that an interface fracture mode is prioritized, and b indicates that the fracture mode is in therebetween. Note that, the fracture surface was observed in five samples.

(Acid Resistance Test)

The composite structure sample (dumbbell test piece) produced in each example/comparative Example was degreased, alkaline-etched, and chemically polished by a known method, and then energized in an electrolytic bath of an aqueous sulfuric acid solution (15% by mass) for 40 minutes (1 A/dm$^2$), and then dyed at 45° C. for 10 minutes (using a red dye manufactured by Okuno Pharmaceutical Co., Ltd.). Then, pores were sealed (nickel acetate method: 95° C. for 10 minutes), and then air-dried after washing with hot water to complete the alumite treatment. The 90° peel strength of the composite structure sample after the alumite treatment was measured in the same manner as described above, and strength retention rates before and after the alumite treatment were computed.

<Preparation of Thermoplastic Resin Composition>

(Preparation of Thermoplastic Resin Composition A1)

80 parts by mass of RESAMINE P (grade name P2275, manufactured by Dainichiseika Color & Chemicals Mfg. Co., Ltd.), which is an ether-based thermoplastic polyurethane (TPU) and 20 parts by mass of NUCREL (grade name N1525, manufactured by DU PONT-MITSUI POLYCHEMICALS CO., LTD.), which is an ethylene-methacrylic acid copolymer were blended. Next, the mixture was sufficiently mixed with a tumbler mixer, melt-kneaded at 190° C. with a twin-screw extruder, and then extruded to obtain a pellet-shaped resin composition A1. The resin composition A1 had a durometer hardness of A78 and an acid value of 6 mgKOH/g.

(Preparation of Thermoplastic Resin Composition A2)

80 parts by mass of RESAMINE P (grade name P2275, manufactured by Dainichiseika Color & Chemicals Mfg. Co., Ltd.), which is the ether-based thermoplastic polyurethane (TPU) and 20 parts by mass of HIMILAN (grade name 1702, manufactured by DU PONT-MITSUI POLYCHEMICALS CO., LTD.), which is Zn ionomer resin of the ethylene-methacrylic acid copolymer were blended. Next, the mixture was sufficiently mixed with a tumbler mixer, melt-kneaded at 190° C. with a twin-screw extruder, and then extruded to obtain a pellet-shaped resin composition A2. The resin composition A2 had a durometer hardness of A79 and an acid value of 7 mgKOH/g.

(Preparation of Thermoplastic Resin Composition A3)

80 parts by mass of RESAMINE P (grade name P2275, manufactured by Dainichiseika Color & Chemicals Mfg. Co., Ltd.), which is the ether-based thermoplastic polyurethane (TPU) and 20 parts by mass of NUCREL (grade name N0908C, manufactured by DU PONT-MITSUI POLYCHEMICALS CO., LTD.), which is an ethylene-methacrylic acid copolymer were blended. Next, the mixture was sufficiently mixed with a tumbler mixer, melt-kneaded at 190° C. with a twin-screw extruder, and then extruded to obtain a pellet-shaped resin composition A3. The resin composition A3 had a durometer hardness of A78 and an acid value of 4 mgKOH/g.

(Preparation of Thermoplastic Resin Composition A4)

90 parts by mass of RESAMINE P™ (grade name P8766, manufactured by Dainichiseika Color & Chemicals Mfg. Co., Ltd.), which is the ether-based thermoplastic polyurethane (TPU) and 10 parts by mass of KURARITY (grade name LA2250, manufactured by KURARAY CO., LTD.), which is an acrylic block copolymer were blended. Next, the mixture was sufficiently mixed with a tumbler mixer, melt-kneaded at 190° C. with a twin-screw extruder, and then extruded to obtain a pellet-shaped resin composition A4. The resin composition A4 had a durometer hardness of A77 and an acid value of 3 mgKOH/g.

(Preparation of Thermoplastic Resin Composition A)

90 parts by mass of RESAMINE P™ (grade name P2275, manufactured by Dainichiseika Color & Chemicals Mfg. Co., Ltd.), which is the urethane-based thermoplastic elastomer (TPU) and 10 parts by mass of Pebax™ (grade name 2533, manufactured by Arkema S.A.), which is an amide-based thermoplastic elastomer were blended. Next, the mixture was sufficiently mixed with a tumbler mixer, melt-kneaded at 190° C. with a twin-screw extruder, and then extruded to obtain a pellet-shaped resin composition A. The resin composition A had a durometer hardness of A73 and an acid value of 0 mgKOH/g.

(Preparation of Thermoplastic Resin Composition B)

80 parts by mass of RESAMINE P™ (grade name P2275, manufactured by Dainichiseika Color & Chemicals Mfg. Co., Ltd.), which is the urethane-based thermoplastic elastomer (TPU), 10 parts by mass of Pebax™ (grade name 2533, manufactured by Arkema S.A.), which is an amide-based thermoplastic elastomer, and 10 parts by mass of NUCREL (grade name NO35C, manufactured by DU PONT-MITSUI POLYCHEMICALS CO., LTD.), which is the ethylene-methacrylic acid copolymer were blended. Next, the mixture was sufficiently mixed with a tumbler mixer, melt-kneaded at 190° C. with a twin-screw extruder, and then extruded to obtain a pellet-shaped resin composition B. The resin composition B had a durometer hardness of A72 and an acid value of 3 mgKOH/g.

(Preparation of Thermoplastic Resin Composition C)

85 parts by mass of RESAMINE P™ (grade name P2275, manufactured by Dainichiseika Color & Chemicals Mfg. Co., Ltd.), which is the urethane-based thermoplastic elastomer (TPU), 5 parts by mass of Pebax™ (grade name 2533, manufactured by Arkema S.A.), which is an amide-based thermoplastic elastomer, and 10 parts by mass of NUCREL (grade name NO35C, manufactured by DU PONT-MITSUI POLYCHEMICALS CO., LTD.), which is the ethylene-methacrylic acid copolymer were blended. Next, the mixture was sufficiently mixed with a tumbler mixer, melt-kneaded at 190° C. with a twin-screw extruder, and then extruded to obtain a pellet-shaped resin composition C. The resin composition C had a durometer hardness of A71 and an acid value of 3 mgKOH/g.

<Surface Roughened Metal Member Used in Present Example>

(Surface Roughened Aluminum Alloy Plate M1)

An aluminum alloy plate (45 mm×18 mm×2 mm) with an alloy number of 6063 specified in JIS H4000 was degreased, was then immersed in a treatment tank 1 filled with an alkaline etching agent (30° C.) containing 15% by mass of sodium hydroxide and 3% by mass of zinc oxide for three minutes (in the following description, may be abbreviated as an "alkaline etching agent treatment"), and was then immersed in 30% by mass nitric acid (30° C.) for one minute. The alkaline etching agent treatment was repeated once more. Next, the obtained aluminum alloy plate was immersed in a treatment tank 2, which is filled with an acid-based etching aqueous solution containing 3.9% by mass of ferric chloride, 0.2% by mass of cupric chloride, and 4.1% by mass of sulfuric acid, at 30° C. for 5 minutes and oscillated. Next, ultrasonic cleaning (in water for 1 minute) was performed with running water, and then a surface roughened aluminum alloy plate M1 was obtained by drying.

As the surface roughness of the surface roughened aluminum alloy plate M1, in surface roughness measured in accordance with JIS B0601: 2001 (corresponding ISO4287) using a surface roughness measuring device "SURFCOM 1400D (manufactured by TOKYO SEIMITSU CO., LTD.)", the ten-point average roughness ($R_{zjis}$) and the average length ($RS_m$) of the roughness curve element were measured, respectively. As a result, an average value of $R_{zjis}$ was 20 μm, and an average value of $RS_m$ was 102 μm. Note that, the $R_{zjis}$ average value and the $RS_m$ average value are average values of the measured values of six points at different measurement locations.

(Surface Roughened Magnesium Alloy Plate M2)

The magnesium alloy plate AZ31B (45 mm×18 mm×2 mm) was immersed in a 7.5% by mass aqueous solution of a commercially available magnesium alloy degreasing agent "Cleaner 160 (manufactured by Meltec)" at 65° C. for five minutes and then washed with water. Then, the magnesium alloy plate was immersed in a 1% by mass aqueous solution of citric acid at 40° C. for four minutes and then washed with water. Thereafter, the magnesium alloy plate was immersed in an aqueous solution containing 1% by mass of sodium carbonate and 1% by mass of sodium hydrogen carbonate at 65° C. for five minutes. Then, the magnesium alloy plate was immersed in a 15% by mass sodium hydroxide aqueous solution at 65° C. for five minutes and then washed with water. Thereafter, the magnesium alloy plate was immersed in a 0.25% by mass citric acid aqueous solution at 40° C. for one minute and then washed with water. Next, the magnesium alloy plate was immersed in an aqueous solution at 45° C. containing 2% by mass of potassium permanganate, 1% by mass of acetic acid, and 0.5% by mass of hydrated sodium acetate for one minute, and then washed with water for 15 seconds, and dried with an air dryer at 90° C. In this manner, a surface roughened magnesium alloy plate M2 was obtained.

As the surface roughness of the surface roughened magnesium alloy plate M2, in surface roughness measured in accordance with JIS B0601: 2001 (corresponding ISO4287) using a surface roughness measuring device "SURFCOM 1400D (manufactured by TOKYO SEIMITSU CO., LTD.)", the ten-point average roughness ($R_{zjis}$) and the average length ($RS_m$) of the roughness curve element were measured, respectively. As a result, an average value of $R_{zjis}$ was 2 μm, and an average value of $RS_m$ was 150 μm. Note that, the $R_{zjis}$ average value and the $RS_m$ average value are average values of the measured values of six points at different measurement locations.

<Method for Producing Composite by Injection Molding>

Figure 3A:
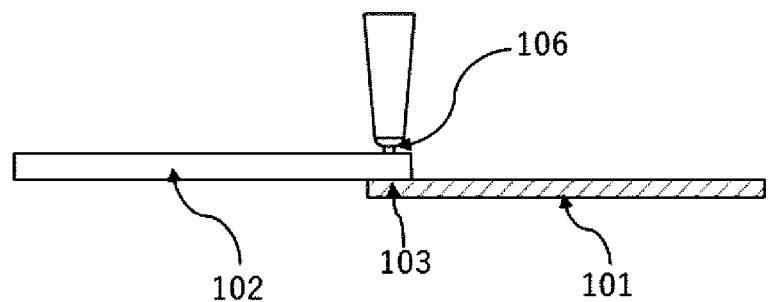
FIGS. 3(a) and 3(b) represent sectional views schematically showing structures of two kinds of mold gate shapes used in injection molding according to the present embodiment, where
Figure 3B:
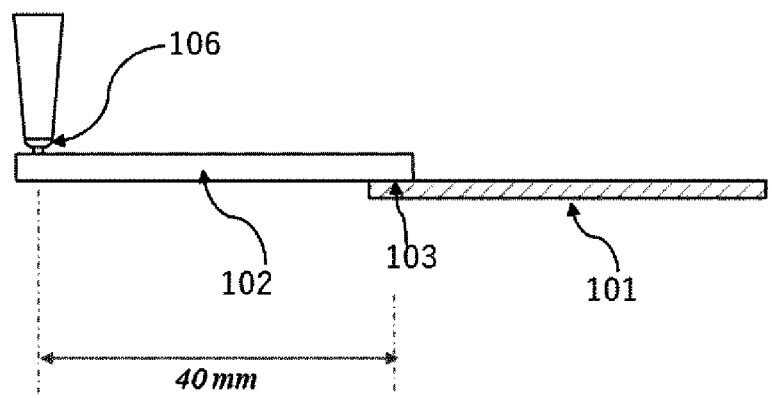

A small dumbbell metal insert mold was mounted on J85AD110H manufactured by Japan Steel Works, Ltd., and the surface roughened aluminum alloy plate M1 or the surface roughened magnesium alloy plate M2 obtained by the above method was installed in the mold. As molding conditions, molding conditions of a cylinder temperature of 190° C., a mold temperature of 40° C., an injection velocity of 25 mm/sec, a pressure keeping at 80 MPa, and a pressure keeping time of 10 seconds were adopted. Also, as a gate shape, any of a pin gate having a short moving distance of molten resin (hereinafter abbreviated as I-type pin gate; see FIG. 3(a)) or a pin gate having a long moving distance (40 mm) of molten resin (hereinafter abbreviated as Z-type pin gate; see FIG. 3(b)) was used. Next, the thermoplastic resin composition was injection-molded in the mold to prepare a composite structure.

Example 1

A composite structure E1 was produced by injection molding (I-type pin gate) the resin composition A1 as the thermoplastic resin composition onto the surface roughened aluminum alloy plate M1. Next, the tensile shear strength was measured (average value) according to the above method. As a result, the tensile shear strength was 4.4 MPa. In addition, the fracture surfaces of the five samples were all determined as a (base material fracture is prioritized). The results are summarized in Table 1. Also, the photograph of the fracture surface was shown in FIG. 5.

Example 2

A composite structure E2 was produced by injection molding (I-type pin gate) the resin composition A2 as the thermoplastic resin composition onto the surface roughened aluminum alloy plate M1. Next, the tensile shear strength was measured (average value) according to the above method. As a result, the tensile shear strength was 3.9 MPa. In addition, the fracture surfaces of the five samples were all determined as a (base material fracture is prioritized). The results are summarized in Table 1.

Example 3

A composite structure E3 was produced by injection molding (I-type pin gate) the resin composition A3 as the thermoplastic resin composition onto the surface roughened aluminum alloy plate M1. Next, the tensile shear strength was measured (average value) according to the above method. As a result, the tensile shear strength was 4.8 MPa. In addition, the fracture surfaces of the five samples were all determined as a (base material fracture is prioritized). The results are summarized in Table 1.

Example 4

A composite structure E4 was produced by injection molding (I-type pin gate) the resin composition A4 as the thermoplastic resin composition onto the surface roughened aluminum alloy plate M1. Next, the tensile shear strength was measured (average value) according to the above method. As a result, the tensile shear strength was 7.2 MPa. In addition, the fracture surfaces of the five samples were all determined as a (base material fracture is prioritized). The results are summarized in Table 1.

Example 5

A composite structure E5 was produced by injection molding (I-type pin gate) the resin composition A1 as the thermoplastic resin composition onto the surface roughened magnesium alloy plate M2. Next, the tensile shear strength was measured (average value) according to the above method. As a result, the tensile shear strength was 3.8 MPa. In addition, the fracture surfaces of the five samples were all determined as a (base material fracture is prioritized). The results are summarized in Table 1. Also, the photograph of the fracture surface was shown in FIG. 7.

Example 6

A composite structure E6 was produced by injection molding (I-type pin gate) the resin composition A2 as the thermoplastic resin composition onto the surface roughened magnesium alloy plate M2. Next, the tensile shear strength was measured (average value) according to the above method. As a result, the tensile shear strength was 4.0 MPa. In addition, the fracture surfaces of the five samples were all determined as a (base material fracture is prioritized). The results are summarized in Table 1.

Example 7

A composite structure E7 was produced by injection molding (I-type pin gate) the resin composition A3 as the thermoplastic resin composition onto the surface roughened magnesium alloy plate M2. Next, the tensile shear strength was measured (average value) according to the above method. As a result, the tensile shear strength was 4.3 MPa. In addition, the fracture surfaces of the five samples were all determined as a (base material fracture is prioritized). The results are summarized in Table 1.

Comparative Example 1

Except that RESAMINE P™ (grade name P2275, manufactured by Dainichiseika Color & Chemicals Mfg. Co., Ltd., durometer hardness=A76, acid value=0 mgKOH/g), which is the ether-based thermoplastic polyurethane (TPU) was used as the resin composition A1, as the thermoplastic resin composition, the same operation as in Example 1 was performed, and a composite structure C1 was produced. Next, as a result of conducting the same evaluation test as in Example 1, the tensile shear strength (average value) was 3.1 MPa. In addition, the fracture surfaces of the five samples were all determined as c (interface fracture is prioritized). The results are summarized in Table 1. Also, the photograph of the fracture surface was shown in FIG. 6.

Comparative Example 2

Except that RESAMINE P™ (grade name P2275, manufactured by Dainichiseika Color & Chemicals Mfg. Co., Ltd., durometer hardness=A76, acid value=0 mgKOH/g), which is the ether-based thermoplastic polyurethane (TPU) was used as the resin composition A1, as the thermoplastic resin composition, the same operation as in Example 5 was performed, and a composite structure C2 was produced. Next, as a result of conducting the same evaluation test as in Example 5, the tensile shear strength (average value) was 1.7 MPa. In addition, the fracture surfaces of the five samples were all determined as c (interface fracture is prioritized). The results are summarized in Table 1. Also, the photograph of the fracture surface was shown in FIG. 8.

TABLE 1

| | Surface roughened alloy plate | Thermoplastic resin composition | Hardness (durometer) | Acid value (mgKOH/g) | Shear strength (MPa) | Fracture mode |
| --- | --- | --- | --- | --- | --- | --- |
| Example 1 | M1 | A1 | A78 | 6 | 4.4 | a |
| Example 2 | M1 | A2 | A79 | 7 | 3.9 | a |
| Example 3 | M1 | A3 | A78 | 4 | 4.8 | a |
| Example 4 | M1 | A4 | A77 | 3 | 7.2 | a |
| Example 5 | M2 | A1 | A78 | 6 | 3.8 | a |
| Example 6 | M2 | A2 | A79 | 7 | 4.0 | a |
| Example 7 | M2 | A3 | A78 | 4 | 4.3 | a |
| Comparative Example 1 | M1 | TPU | A76 | 0 | 3.1 | c |
| Comparative Example 2 | M2 | TPU | A76 | 0 | 1.7 | c |

Note)
Method for determining fracture form
a; As a result of observing, with a magnifier, a metal-side bonding surface after a tensile shear test, a resin residue was found on equal to or more than 70 area % of the bonding surface.
b; As a result of observing, with a magnifier, a metal-side bonding surface after a tensile shear test, a resin residue was found on equal to or more than 50 area % of the bonding surface.
c; As a result of observing, with a magnifier, a metal side bonding surface after a tensile shear test, a resin residue was found on less than 50 area % of the bonding surface.

Reference Example 1

A composite structure R1 was produced by injection molding the thermoplastic resin composition A as the thermoplastic resin composition onto the surface roughened aluminum alloy plate M1 by using the I-type pin gate mold. The peel strength of the composite structure R1 was measured (average value) according to the above method. As a result, the strength (average value) was 32 N/10 mm. In addition, the fracture surfaces of the five samples were all determined as a (base material fracture is prioritized). Also, the photograph of the fracture surface was shown in FIG. 9.

In addition, the 90° peel strength (average value) after the acid resistance test was 18 N/10 mm, and the strength retention rate was 56%.

Reference Example 2

A composite structure R2 was produced by injection molding the thermoplastic resin composition A as the thermoplastic resin composition onto the surface roughened magnesium alloy plate M2 by using the I-type pin gate mold. Next, the tensile shear strength was measured (average value) according to the above method. As a result, the bonding strength (average value) was 3.8 MPa. In addition, the fracture surfaces of the five samples were all determined as a (base material fracture is prioritized). Also, the photograph of the fracture surface was shown in FIG. 11.

Reference Example 3

Except that the Z-type pin gate mold was used instead of the I-type pin gate mold in Reference Example 1, a composite structure R3 was produced in exactly the same manner as in Reference Example 1. Next, the peel strength was measured (average value) according to the above method. As a result, the strength (average value) was 10 N/10 mm. In addition, the fracture surfaces of the five samples were all determined as a (base material fracture is prioritized).

Example 8

A composite structure E8 was produced by injection molding the thermoplastic resin composition B as the thermoplastic resin composition onto the surface roughened aluminum alloy plate M1 by using the Z-type pin gate mold. Next, the peel strength was measured (average value) according to the above method. As a result, the strength (average value) was 23 N/10 mm. In addition, the fracture surfaces of the five samples were all determined as a (base material fracture is prioritized). In addition, the 90° peel strength (average value) after the acid resistance test was 21 N/10 mm, and the strength retention rate was 91%.

Example 9

A composite structure E9 was produced by injection molding the thermoplastic resin composition C as the thermoplastic resin composition onto the surface roughened aluminum alloy plate M1 by using the I-type pin gate mold. Next, the peel strength was measured (average value) according to the above method. As a result, the strength (average value) was 28 N/10 mm. In addition, the fracture surfaces of the five samples were all determined as a (base material fracture is prioritized). In addition, the 90° peel strength (average value) after the acid resistance test was 25 N/10 mm, and the strength retention rate was 90%. A photograph of the fracture surface (metal member side) was shown in FIG. 13.

Example 10

A composite structure E10 was produced by injection molding the thermoplastic resin composition C as the thermoplastic resin composition onto the surface roughened aluminum alloy plate M1 by using the Z-type pin gate mold. Next, the peel strength was measured (average value) according to the above method. As a result, the strength (average value) was 23 N/10 mm. In addition, the fracture surfaces of the five samples were all determined as a (base material fracture is prioritized). In addition, the 90° peel strength (average value) after the acid resistance test was 21 N/10 mm, and the strength retention rate was 91%. A photograph of the fracture surface (metal member side) was shown in FIG. 14.

Comparative Example 3

Except that RESAMINE P™ (grade name P2275, manufactured by Dainichiseika Color & Chemicals Mfg. Co., Ltd.), which is the urethane-based thermoplastic elastomer (TPU) was used instead of the thermoplastic resin composition A, as the thermoplastic resin composition, the same operation as in Reference Example 1 was performed, and a composite structure C3 was produced. Next, the same 90° peel strength test as in Reference Example 1 was performed. As a result, the strength (average value) was 5.0 N/10 mm. In addition, the fracture surfaces of the five samples were all determined as c (interface fracture is prioritized). Also, the photograph of the fracture surface was shown in FIG. 10. Note that, the 90° peel strength (average value) after the acid resistance test was 4.8 N/10 mm, and the strength retention rate was 96%.

Comparative Example 4

Except that RESAMINE P™ (grade name P2275), which is the urethane-based thermoplastic elastomer (TPU) was used instead of the thermoplastic resin composition A, as the thermoplastic resin composition, the same operation as in Reference Example 2 was performed, and a composite structure C4 was produced. Next, the same evaluation test as in Reference Example 2 was performed. As a result, the bonding strength (average value) was 1.6 MPa. In addition, the fracture surfaces of the five samples were all determined as c (interface fracture is prioritized). Also, the photograph of the fracture surface was shown in FIG. 12.

Comparative Example 5

Except that the Z-type pin gate mold was used instead of the I-type pin gate mold in Comparative Example 3, a composite structure C5 was produced in exactly the same manner as in Comparative Example 3. Next, the peel strength was measured (average value) according to the above method. As a result, the strength (average value) was 2.0 N/10 mm. In addition, the fracture surfaces of the five samples were all determined as c (interface fracture is prioritized).

Comparative Example 6

Except that Pebax™ (grade name 2533, manufactured by Arkema S.A., durometer hardness=A76, and acid value=0 mgKOH/g), which is the amide-based thermoplastic elastomer (TPAE) was used instead of the thermoplastic resin composition A, as the thermoplastic resin composition, the same operation as in Reference Example 1 was performed, and a composite structure C6 was produced. Next, the same 90° peel strength test as in Reference Example 1 was performed. As a result, the strength (average value) was 28 N/10 mm. In addition, the fracture surfaces of the five samples were all determined as c (interface fracture is prioritized). Note that, the 90° peel strength (average value) after the acid resistance test was 8 N/10 mm, and the strength retention rate was 30%.

TABLE 2

| | Surface roughened alloy plate | Thermoplastic resin composition | Hardness (durometer) | Acid value (mgKOH/g) | Shear strength (MPa) | 90° Peel strength (N/10 mm) | 90° Peel strength after acid resistance test (N/10 mm) | Strength retention rate (%) | Fracture mode |
|---|---|---|---|---|---|---|---|---|---|
| Example 8 | M1 | B | A72 | 3 | ND | 23.0 | 21.0 | 91 | a |
| Example 9 | M1 | C | A71 | 3 | ND | 28.0 | 25.0 | 90 | a |
| Example 10 | M1 | C | A71 | 3 | ND | 23.0 | 21.0 | 91 | a |
| Comparative Example 3 | M1 | TPU | A76 | 0 | ND | 5.0 | 4.8 | 96 | c |
| Comparative Example 4 | M2 | TPU | A76 | 0 | 1.6 | ND | ND | ND | c |
| Comparative Example 5 | M1 | TPU | A76 | 0 | ND | 2.0 | ND | ND | c |
| Comparative Example 6 | M1 | TPAE | A76 | 0 | ND | 28.0 | 8.0 | 30 | c |
| Reference Example 1 | M1 | A | A73 | 0 | ND | 32.0 | 18.0 | 56 | a |
| Reference Example 2 | M2 | A | A73 | 0 | 3.8 | ND | ND | ND | a |
| Reference Example 3 | M1 | A | A73 | 0 | ND | 10.0 | ND | ND | a |

Note)
Method for determining fracture form
a; As a result of observing, with a magnifier, a metal-side bonding surface after a tensile shear or 90° peeling test, a resin residue was found on equal to or more than 70 area % of the bonding surface.
b; As a result of observing, with a magnifier, a metal-side bonding surface after a tensile shear or 90° peeling test, a resin residue was found on equal to or more than 50 area % and less than 70 area % of the bonding surface.
c; As a result of observing, with a magnifier, a metal-side bonding surface after a tensile shear or 90° peeling test, a resin residue was found on less than 50 area % of the bonding surface.

The present application claims priority based on Japanese Patent Application No. 2018-151598, filed Aug. 10, 2018, and Japanese Patent Application No. 2018-215777, filed Nov. 16, 2018, the entire contents of which are incorporated herein.

The present invention also includes the following aspects.

[1A]
A composite structure including:
a metal member; and
a thermoplastic resin member bonded to the metal member,
in which the metal member has a fine uneven structure at least on a metal surface to which the thermoplastic resin member is bonded,
a hardness of the thermoplastic resin member measured by a type A durometer in accordance with JIS K6253 is in a range of equal to or more than A60 and equal to or less than A95, and
an acid value of the thermoplastic resin member is equal to or more than 1 mgKOH/g and equal to or less than 100 mgKOH/g.

[2A]
The composite structure according to [1A], in which an average length (RSm) of a roughness curve element of the metal surface on which the fine uneven structure is formed, the average length being measured in accordance with JIS B0601: 2001, is equal to or more than 10 nm and equal to or less than 500 μm.

[3A]
The composite structure according to [1A] or [2A], in which a ten-point average roughness (Rzjis) of the metal surface on which the fine uneven structure is formed, the ten-point average roughness being measured in accordance with JIS B0601: 2001, is equal to or more than 10 nm and equal to or less than 300 μm.

[4A]
The composite structure according to any one of [1A] to [3A], in which the thermoplastic resin member contains a thermoplastic elastomer.

[5A]
The composite structure according to [4A], in which a content of the thermoplastic elastomer in the thermoplastic resin member is equal to or more than 50% by mass.

[6A]
The composite structure according to [4A] or [5A], in which the thermoplastic resin member further contains an acid-modified polymer.

[7A]
The composite structure according to [6A], in which in the thermoplastic resin member, a content of the thermoplastic elastomer is equal to or more than 50% by mass and equal to or less than 99% by mass, and a content of the acid-modified polymer is equal to or more than 1% by mass and equal to or less than 50% by mass.

[8A]
The composite structure according to any one of [4A] to [7A], in which the thermoplastic elastomer contains a urethane-based thermoplastic elastomer.

[9A]
A housing for an electronic device, including the composite structure according to any one of [1A] to [8A],
in which the metal member includes a first metal member and a second metal member,
a packing formed of the thermoplastic resin member is bonded to a peripheral edge part of the first metal member, and
an outer shell is formed by integrating the second metal member with the first metal member, with the packing interposed therebetween.

Furthermore, the present invention also includes the following aspects.

[1B]
A composite structure including:
a metal member; and
a thermoplastic resin member bonded to the metal member, in which the metal member has a fine uneven structure at least on a metal surface to which the thermoplastic resin member is bonded, and the thermoplastic resin member contains a urethane-based thermoplastic elastomer and an amide-based thermoplastic elastomer.

[2B]

The composite structure according to [1B], in which a total content of the urethane-based thermoplastic elastomer and the amide-based thermoplastic elastomer in the thermoplastic resin member is equal to or more than 60% by mass and equal to or less than 100% by mass.

[3B]

The composite structure according to [1B] or [2B], in which in the thermoplastic elastomer, a content of the urethane-based thermoplastic elastomer is equal to or more than 70% by mass and less than 100% by mass, and a content of the amide-based thermoplastic elastomer is more than 0% by mass and equal to or less than 30% by mass.

[4B]

The composite structure according to any one of [1B] to [3B], in which the thermoplastic resin member further contains an acid-modified polymer, and a content of the acid-modified polymer in the thermoplastic resin member is equal to or more than 1 part by mass and equal to or less than 35 parts by mass with respect to a total of 100 parts by mass of the urethane-based thermoplastic elastomer and the amide-based thermoplastic elastomer.

[5B]

The composite structure according to any one of [1B] to [4B], in which an average length (RSm) of a roughness curve element of the metal surface on which the fine uneven structure is formed, the average length being measured in accordance with JIS B0601: 2001, is equal to or more than 10 nm and equal to or less than 500 µm.

[6B]

The composite structure according to any one of [1B] to [5B], in which a ten-point average roughness (Rzjis) of the metal surface on which the fine uneven structure is formed, the ten-point average roughness being measured in accordance with JIS B0601: 2001, is equal to or more than 10 nm and equal to or less than 300 µm.

[7B]

A housing for an electronic device, including the composite structure according to any one of [1B] to [6B], in which the housing for an electronic device has a first metal member and a second metal member, a packing formed of the thermoplastic resin member is bonded to a peripheral edge part of the first metal member, and an outer shell is formed by integrating the second metal member with the first metal member, with the packing interposed therebetween.

[8B]

A housing for an electronic device, including the composite structure according to any one of [1B] to [6B], in which the housing for an electronic device has a metal member and a plastic member, a packing formed of the thermoplastic resin member is bonded to a peripheral edge part of the metal member, and an outer shell is formed by integrating the metal member with the plastic member, with the packing interposed therebetween.

REFERENCE SIGNS LIST

1: First metal member
11: Fitting surface
12: Recessed groove
2: Second metal member
21: Fitting surface
22: Recessed groove
3: Packing
101: Metal member
102: Thermoplastic resin member
103: End
105: Dedicated jig
106: Pin gate

The invention claimed is:

1. A composite structure comprising:

a metal member; and a thermoplastic resin member bonded to the metal member, wherein the metal member has a fine uneven structure at least on a metal surface to which the thermoplastic resin member is bonded, a hardness of the thermoplastic resin member measured by a type A durometer in accordance with JIS K6253 is in a range of equal to or more than A60 and equal to or less than A95, and an acid value of the thermoplastic resin member is equal to or more than 1 mgKOH/g and equal to or less than 100 mgKOH/g, wherein an average length (RSm) of a roughness curve element of the metal surface on which the fine uneven structure is formed, the average length being measured in accordance with JIS B0601: 2001, is equal to or more than 10 nm and equal to or less than 500 µm;

a ten-point average roughness (Rzjis) of the metal surface on which the fine uneven structure is formed, the ten-point average roughness being measured in accordance with JIS B0601: 2001, is equal to or more than 10 nm and equal to or less than 300 µm;

the thermoplastic resin member contains a thermoplastic elastomer; and the thermoplastic elastomer consists of an elastic material that does not need to be vulcanized, wherein the thermoplastic resin member contains a urethane-based thermoplastic elastomer and an amide-based thermoplastic elastomer, wherein the thermoplastic resin member further contains an acid-modified polymer, wherein, in the thermoplastic elastomer, a content of the urethane-based thermoplastic elastomer is equal to or more than 70% by mass and equal to or less than 99% by mass, and a content of the amide-based thermoplastic elastomer is equal to or more than 1% by mass and equal to or less than 30% by mass, and wherein, in the thermoplastic resin member, a content of the thermoplastic elastomer is equal to or more than 60% by mass and equal to or less than 95% by mass, and a content of the acid-modified polymer is equal to or more than 5% by mass and equal to or less than 40% by mass.

2. The composite structure according to claim 1, wherein the hardness of the thermoplastic resin member is in a range of equal to or more than A71 and equal to or less than A95.

3. The composite structure according to claim 1, wherein the metal member is a surface roughened aluminum alloy plate.

4. The composite structure according to claim 1, wherein the acid-modified polymer is an ethylene/(meth)acrylic acid copolymer.

5. The composite structure according to claim 1, wherein, in the thermoplastic elastomer, the content of the urethane-based thermoplastic elastomer is equal to or more than 75% by mass and equal to or less than 98% by mass, and the content of the amide-based thermoplastic elastomer is equal to or more than 2% by mass and equal to or less than 25% by mass.

6. The composite structure according to claim 1, wherein the metal member is a surface roughened aluminum alloy plate, and the acid-modified polymer is an ethylene/(meth)acrylic acid copolymer, and wherein, in the thermoplastic elastomer, the content of the urethane-based thermoplastic elastomer is equal to or more than 75% by mass and equal to or less than 98% by mass, and the content of the amide-based thermoplastic elastomer is equal to or more than 2% by mass and equal to or less than 25% by mass.

7. A housing for an electronic device, comprising:
the composite structure according to claim 1,
wherein the housing for an electronic device has a first metal member and a second metal member,
the first metal member is the metal member,
a packing formed of the thermoplastic resin member is bonded to a peripheral edge part of the first metal member, and
an outer shell is formed by integrating the second metal member with the first metal member, with the packing interposed therebetween.

8. A housing for an electronic device, comprising the composite structure according to claim 1,
wherein the housing for an electronic device has a plastic member,
a packing formed of the thermoplastic resin member is bonded to a peripheral edge part of the metal member, and
an outer shell is formed by integrating the metal member with the plastic member, with the packing interposed therebetween.

* * * * *